(12) United States Patent
Sejpal et al.

(10) Patent No.: US 9,553,635 B1
(45) Date of Patent: Jan. 24, 2017

(54) TIME BASED EQUALIZATION FOR A C-PHY 3-PHASE TRANSMITTER

(71) Applicant: QUALCOMM Incorporated, San Diego, CA (US)

(72) Inventors: Dhaval Sejpal, San Diego, CA (US); Chulkyu Lee, San Diego, CA (US); George Alan Wiley, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 14/808,272

(22) Filed: Jul. 24, 2015

(51) Int. Cl.
*H04L 25/34* (2006.01)
*H04B 3/54* (2006.01)
*H04B 3/462* (2015.01)

(52) U.S. Cl.
CPC ............. *H04B 3/54* (2013.01); *H04B 3/462* (2013.01)

(58) Field of Classification Search
CPC .......................... H04L 25/49; H04L 25/4917
USPC .................................................. 375/286, 288
See application file for complete search history.

(56) References Cited

U.S. PATENT DOCUMENTS

| 2014/0153665 | A1 | 6/2014 | Wiley et al. |
| 2014/0254712 | A1 | 9/2014 | Lee et al. |
| 2015/0030112 | A1 | 1/2015 | Wiley et al. |
| 2015/0043358 | A1 | 2/2015 | Wiley et al. |
| 2015/0043693 | A1 | 2/2015 | Lee et al. |
| 2015/0098538 | A1 | 4/2015 | Wiley et al. |
| 2015/0280896 | A1* | 10/2015 | Kil ............. H04L 7/033 375/362 |
| 2016/0013926 | A1* | 1/2016 | Kil ............. H04L 7/0041 370/517 |
| 2016/0119169 | A1* | 4/2016 | Schober ....... H04L 27/0014 370/503 |

OTHER PUBLICATIONS

International Search Report and Written Opinion—PCT/US2016/039667—ISA/EPO—Sep. 22, 2016.

\* cited by examiner

*Primary Examiner* — David S Huang
(74) *Attorney, Agent, or Firm* — Loza & Loza, LLP

(57) ABSTRACT

A method, an apparatus, and a computer program product for data communication over a multi-wire, multi-phase interface are provided. The method may include providing a sequence of symbols to be transmitted on a 3-wire interface, each symbol in the sequence of symbols defining one of three voltage states for each wire of the 3-wire interface, driving all wires of the 3-wire interface to a common voltage state during a transition from a first transmitted symbol to a second transmitted symbol, driving each wire of the 3-wire interface in accordance with the second transmitted symbol after a predetermined delay. Each wire may be in a different voltage state from the other wires of the 3-wire interface during transmission of the each symbol. The common voltage state may lie between two of the three voltage states.

30 Claims, 17 Drawing Sheets

TIME BASED EQUALIZATION FOR A C-PHY 3-PHASE TRANSMITTER

TECHNICAL FIELD

The present disclosure relates generally to high-speed data communications interfaces, and more particularly, to conditioning signals transmitted on a multi-wire, multi-phase data communication link.

BACKGROUND

Manufacturers of mobile devices, such as cellular phones, may obtain components of the mobile devices from various sources, including different manufacturers. For example, an application processor in a cellular phone may be obtained from a first manufacturer, while the display for the cellular phone may be obtained from a second manufacturer. The application processor and a display or other device may be interconnected using a standards-based or proprietary physical interface. For example, a display may provide an interface that conforms to the Display System interface (DSI) standard specified by the Mobile Industry Processor Interface (MIPI) Alliance.

Higher frequency components of a high-speed signal traveling through a channel can be significantly attenuated due to channel bandwidth limitations, and the degree of attenuation may correlate to the frequency of the signal. The losses of high frequency components can cause inter-symbol interference (ISI) and can increase jitter. A commonly-used compensation technique employs pre-emphasis at the transmitter, which may also be referred to as feed-forward equalization (FFE). FFE can be employed in single-ended and differential line drivers, but has limited effect on other types of drivers.

In one example, a three-wire interface (C-PHY) defined by the MIPI Alliance uses a trio of conductors rather than differential pairs to transmit information between devices. Each of the three wires may be in one of three signaling states during transmission of a symbol over the C-PHY interface. Clock information is encoded in a sequence of symbols transmitted on the C-PHY link and a receiver generates a clock signal from transitions between consecutive symbols. In a C-PHY interface, the maximum speed of the communication link and the ability of a clock-data recovery (CDR) circuit to recover clock information may be limited by the maximum time variation related to transitions of signals transmitted on the different wires of the communication link.

Accordingly, there is an ongoing need to improve signaling capabilities of multi-wire interfaces.

SUMMARY

Embodiments disclosed herein provide systems, methods and apparatus that enable improved communications on a multi-wire and/or multiphase communications link. The communications link may be deployed in apparatus such as a mobile terminal having multiple Integrated Circuit (IC) devices.

In an aspect of the disclosure, a method of data communication includes providing a sequence of symbols to be transmitted on a 3-wire interface, each symbol in the sequence of symbols defining one of three voltage states for each wire of the 3-wire interface, driving all wires of the 3-wire interface to a common voltage state for a predetermined time interval during a transition from a first transmitted symbol to a second transmitted symbol, and driving each wire of the 3-wire interface in accordance with the second transmitted symbol after the predetermined time interval has elapsed. Each wire may be in a different voltage state from the other wires of the 3-wire interface during transmission of the each symbol. The common voltage state may lie between two of the three voltage states.

In an aspect of the disclosure, an apparatus for data communication includes means for providing a sequence of symbols to be transmitted on a 3-wire interface, each symbol in the sequence of symbols defining one of three voltage states for each wire of the 3-wire interface, means for driving all wires of the 3-wire interface to a common voltage state during a transition from a first transmitted symbol to a second transmitted symbol, and means for driving each wire of the 3-wire interface in accordance with the second transmitted symbol after a predetermined delay. Each wire may be in a different voltage state from the other wires of 3-wire interface during transmission of the each symbol. The common voltage state may lie between two of the three voltage states.

In an aspect of the disclosure, an apparatus for data communication includes a plurality of line drivers coupled to a 3-wire bus, an encoder configured to provide a sequence of symbols to be transmitted on the 3-wire bus, each symbol in the sequence of symbols defining one of three voltage states for each wire of the 3-wire bus, where each wire is in a different voltage state from the other wires of 3-wire bus during transmission of the each symbol, and a processing system configured to cause the plurality of line drivers to drive all wires of the 3-wire bus to a common voltage state during a transition from a first transmitted symbol to a second transmitted symbol, and cause the plurality of line drivers to drive each wire of the 3-wire bus in accordance with the second transmitted symbol after a predetermined delay. The common voltage state may lie between two of the three voltage states.

In an aspect of the disclosure, a processor readable storage medium is disclosed. The storage medium may be a non-transitory storage medium and may store code that, when executed by one or more processors, causes the one or more processors to provide a sequence of symbols to be transmitted on a 3-wire interface, each symbol in the sequence of symbols defining one of three voltage states for each wire of the 3-wire interface, drive all wires of the 3-wire interface to a common voltage state during a transition from a first transmitted symbol to a second transmitted symbol, drive each wire of the 3-wire interface in accordance with the second transmitted symbol after a predetermined delay. The common voltage state may lie between two of the three voltage states. Each wire may be in a different voltage state from the other wires of 3-wire interface during transmission of the each symbol.

DETAILED DESCRIPTION

Figure 1:
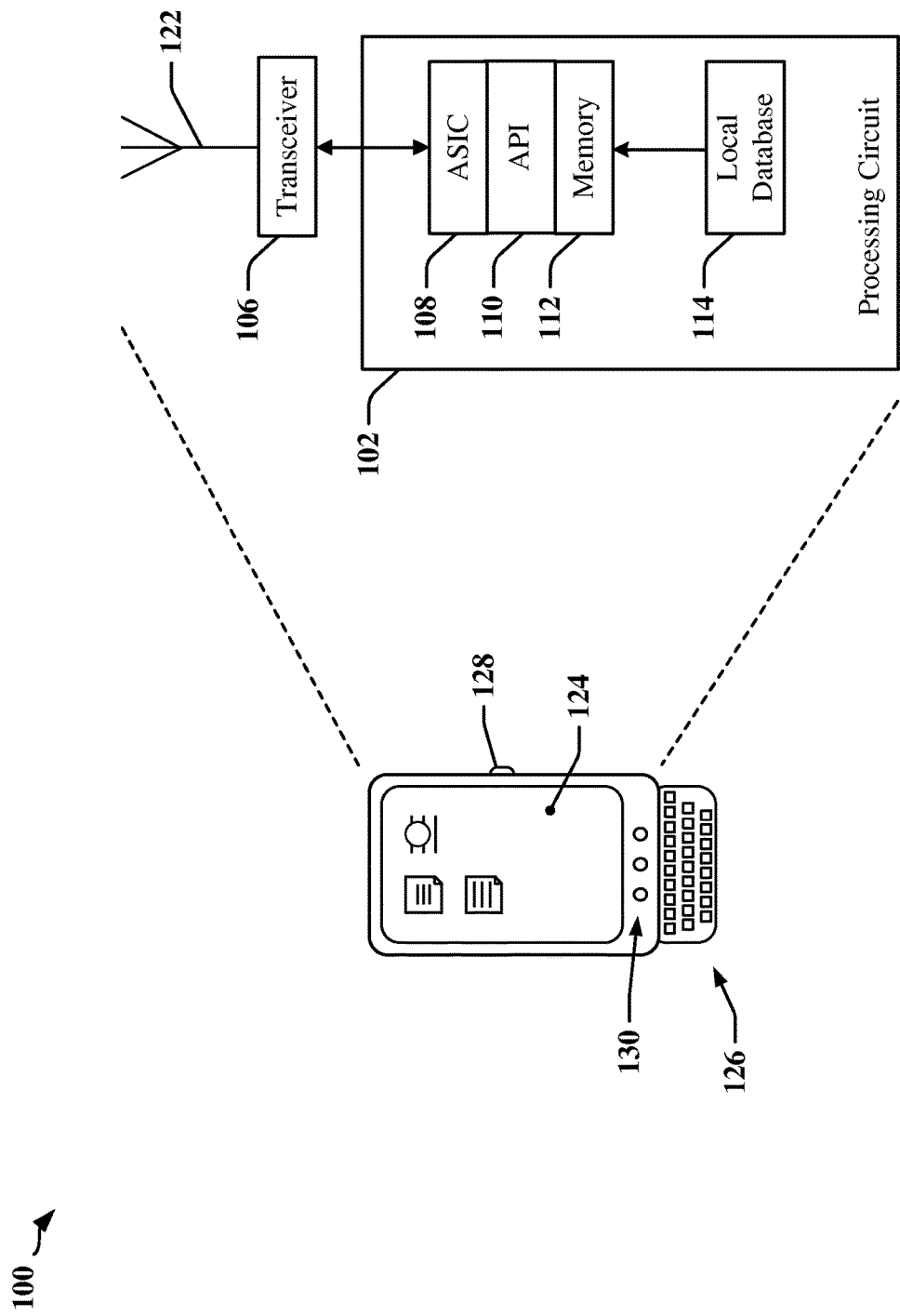
FIG. 1 depicts an apparatus employing a data link between IC devices that selectively operates according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Overview

Certain aspects of the invention may be applicable to a C-PHY interface specified by the MIPI Alliance, which may be deployed to connect electronic devices that are subcomponents of a mobile apparatus such as a telephone, a mobile computing device, an appliance, automobile electronics, avionics systems, etc. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, a wearable computing device (e.g., a smartwatch, a health or fitness tracker, etc.), an appliance, a sensor, a vending machine, or any other similarly functioning device.

The C-PHY interface is a high-speed serial interface that can provide high throughput over bandwidth-limited channels. The C-PHY interface may be deployed to connect application processors to peripherals, including displays and cameras. The C-PHY interface encodes data into symbols that are transmitted in a three-phase signal over a set of three wires, which may be referred to as a trio, or trio of wires. The three-phase signal is transmitted on each wire of the trio in different phases. Each three-wire trio provides a lane on a communications link. A symbol interval may be defined as the interval of time in which a single symbol controls the signaling state of a trio. In each symbol interval, one wire is "undriven" while the remaining two of the three wires are differentially driven such that one of the two differentially driven wires assumes a first voltage level and the other differentially driven wire assumes to a second voltage level different from the first voltage level. The undriven wire may float, be driven or terminated such that it assumes a third voltage level that is at or near the mid-level voltage between the first and second voltage levels. In one example, the driven voltage levels may be +V and −V with the undriven voltage being 0 V. In another example, the driven voltage levels may be +V and 0 V with the undriven voltage being +V/2. Different symbols are transmitted in each consecutively transmitted pair of symbols, and different pairs of wires may be differentially driven in different symbol intervals.

FIG. 1 depicts an example of apparatus 100 that may employ a C-PHY 3-phase communication link. The apparatus 100 may include a wireless communication device that communicates through a radio frequency (RF) communications transceiver 106 with a radio access network (RAN), a core access network, the Internet and/or another network. The communications transceiver 106 may be operably coupled to a processing circuit 102. The processing circuit 102 may include one or more IC devices, such as an application-specific IC (ASIC) 108. The ASIC 108 may include one or more processing devices, logic circuits, and so on. The processing circuit 102 may include and/or be coupled to processor readable storage such as memory devices 112 that may include processor-readable devices that store and maintain data and instructions for execution or for other use by the processing circuit 102 and devices or memory cards that support a display 124. The processing circuit 102 may be controlled by one or more of an operating system and an application programming interface (API) 110 layer that supports and enables execution of software modules residing in storage media, such as the memory device 112 of the wireless device. The memory devices 112 may include read-only memory (ROM), dynamic random-access memory (DRAM), one or more types of programmable read-only memory (PROM), flash cards, or any memory type that can be used in processing systems and computing platforms. The processing circuit 102 may include or access a local database 114 that can maintain operational parameters and other information used to configure and operate the apparatus 100. The local database 114 may be implemented using one or more of a database module, flash memory, magnetic media, electrically-erasable PROM (EEPROM), optical media, tape, soft or hard disk, or the like. The processing circuit may also be operably coupled to external devices such as an antenna 122, the display 124, operator controls, such as a button 128 and a keypad 126 among other components.

Figure 2:
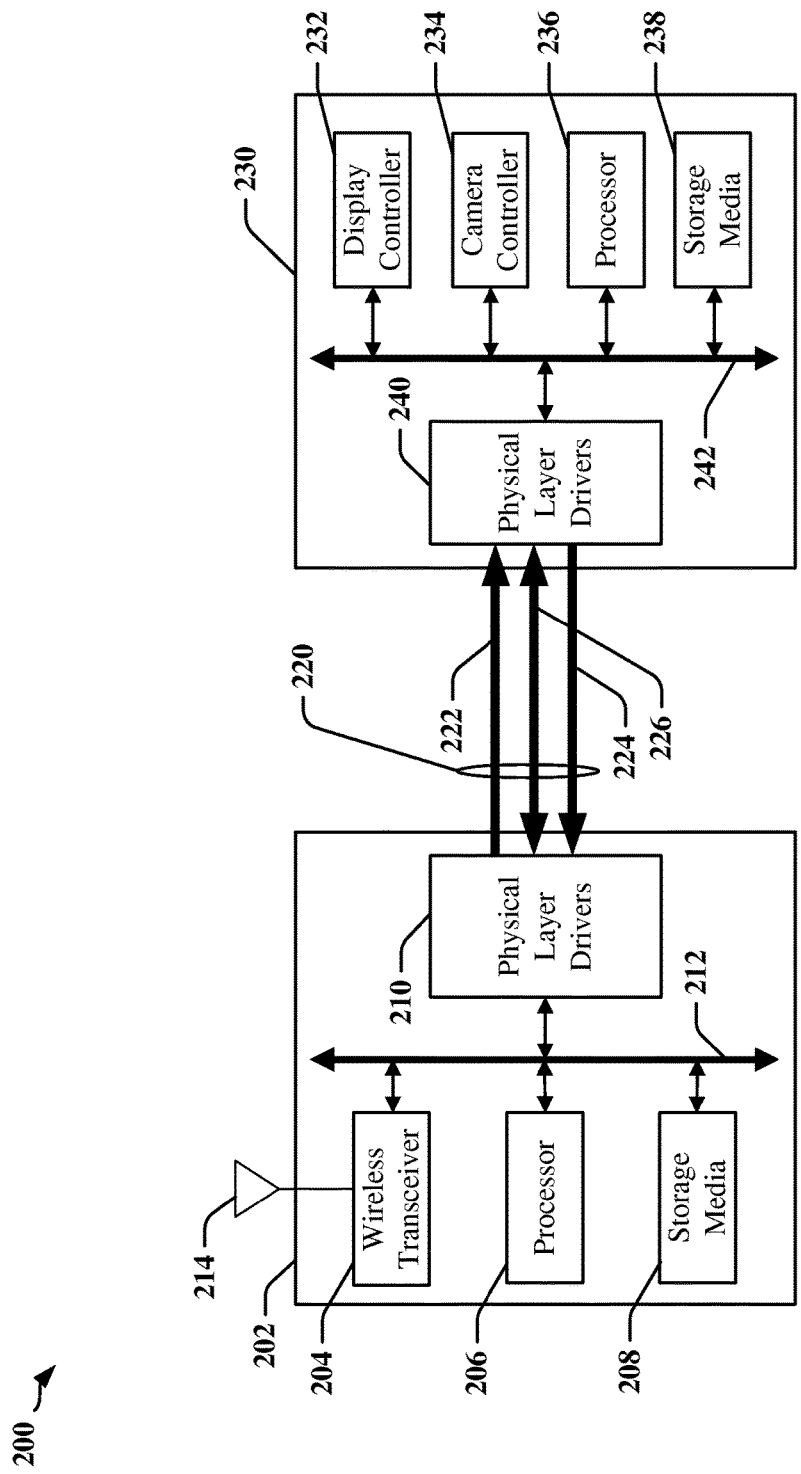
FIG. 2 illustrates a system architecture for an apparatus employing a data link between IC devices that selectively operates according to one of plurality of available standards.

FIG. 2 is a block schematic illustrating certain aspects of an apparatus 200 that includes a plurality of IC devices 202 and 230, which can exchange data and control information through a communication link 220. The communication link 220 may be used to connect a pair of IC devices 202 and 230 that are located in close proximity to one another, or that are physically located in different parts of the apparatus 200. In one example, the communication link 220 may be provided on a chip carrier, substrate or circuit board that carries the IC devices 202 and 230. In another example, a first IC device 202 may be located in a keypad section of a flip-phone while a second IC device 230 may be located in a display section of the flip-phone. In another example, a portion of the communication link 220 may include a cable or optical connection.

The communication link 220 may include multiple channels 222, 224 and 226. One or more channel 226 may be bidirectional, and may operate in half-duplex and/or full-duplex modes. One or more channel 222 and 224 may be unidirectional. The communication link 220 may be asymmetrical, providing higher bandwidth in one direction. In one example described herein, a first communications channel 222 may be referred to as a forward channel 222 while a second communications channel 224 may be referred to as a reverse channel 224. The first IC device 202 may be designated as a host system or transmitter, while the second IC device 230 may be designated as a client system or receiver, even if both IC devices 202 and 230 are configured to transmit and receive on the communications channel 222. In one example, the forward channel 222 may operate at a higher data rate when communicating data from a first IC device 202 to a second IC device 230, while the reverse channel 224 may operate at a lower data rate when communicating data from the second IC device 230 to the first IC device 202.

The IC devices 202 and 230 may each include a processor or other processing and/or computing circuit or device 206, 236. In one example, the first IC device 202 may perform core functions of the apparatus 200, including establishing and maintaining wireless communications through a wireless transceiver 204 and an antenna 214, while the second IC device 230 may support a user interface that manages or operates a display controller 232, and may control operations of a camera or video input device using a camera controller 234. Other features supported by one or more of the IC devices 202 and 230 may include a keyboard, a voice-recognition component, and other input or output devices. The display controller 232 may include circuits and software drivers that support displays such as a liquid crystal display (LCD) panel, touch-screen display, indicators and so on. The storage media 208 and 238 may include transitory and/or non-transitory storage devices adapted to maintain instructions and data used by respective processors 206 and 236, and/or other components of the IC devices 202 and 230. Communication between each processor 206, 236 and its corresponding storage media 208 and 238 and other modules and circuits may be facilitated by one or more internal bus 212 and 242 and/or a channel 222, 224 and/or 226 of the communication link 220.

The reverse channel 224 may be operated in the same manner as the forward channel 222, and the forward channel 222, and the reverse channel 224 may be capable of transmitting at comparable speeds or at different speeds, where speed may be expressed as data transfer rate and/or clocking rates. The forward and reverse data rates may be substantially the same or differ by orders of magnitude, depending on the application. In some applications, a single bidirectional channel 226 may support communications between the first IC device 202 and the second IC device 230. The forward channel 222 and/or the reverse channel 224 may be configurable to operate in a bidirectional mode when, for example, the forward and reverse channels 222 and 224 share the same physical connections and operate in a half-duplex manner. In one example, the communication link 220 may be operated to communicate control, command and other information between the first IC device 202 and the second IC device 230 in accordance with an industry or other standard.

The communication link 220 of FIG. 2 may be implemented according to MIPI Alliance specifications for C-PHY and may provide a wired bus that includes a plurality of signal wires (denoted as M wires). The M wires may be configured to carry N-phase encoded data in a high-speed digital interface, such as a mobile display digital interface (MDDI). The M wires may facilitate N-phase polarity encoding on one or more of the channels 222, 224 and 226. The physical layer drivers 210 and 240 may be configured or adapted to generate N-phase polarity encoded data for transmission on the communication link 220. The use of N-phase polarity encoding provides high speed data transfer and may consume half or less of the power of other interfaces because fewer drivers are active in N-phase polarity encoded data links.

N-phase polarity encoding devices 210 and/or 240 can typically encode multiple bits per transition on the communication link 220. In one example, a combination of 3-phase encoding and polarity encoding may be used to support a wide video graphics array (WVGA) 80 frames per second LCD driver IC without a frame buffer, delivering pixel data at 810 Mbps for display refresh.

Figure 3:
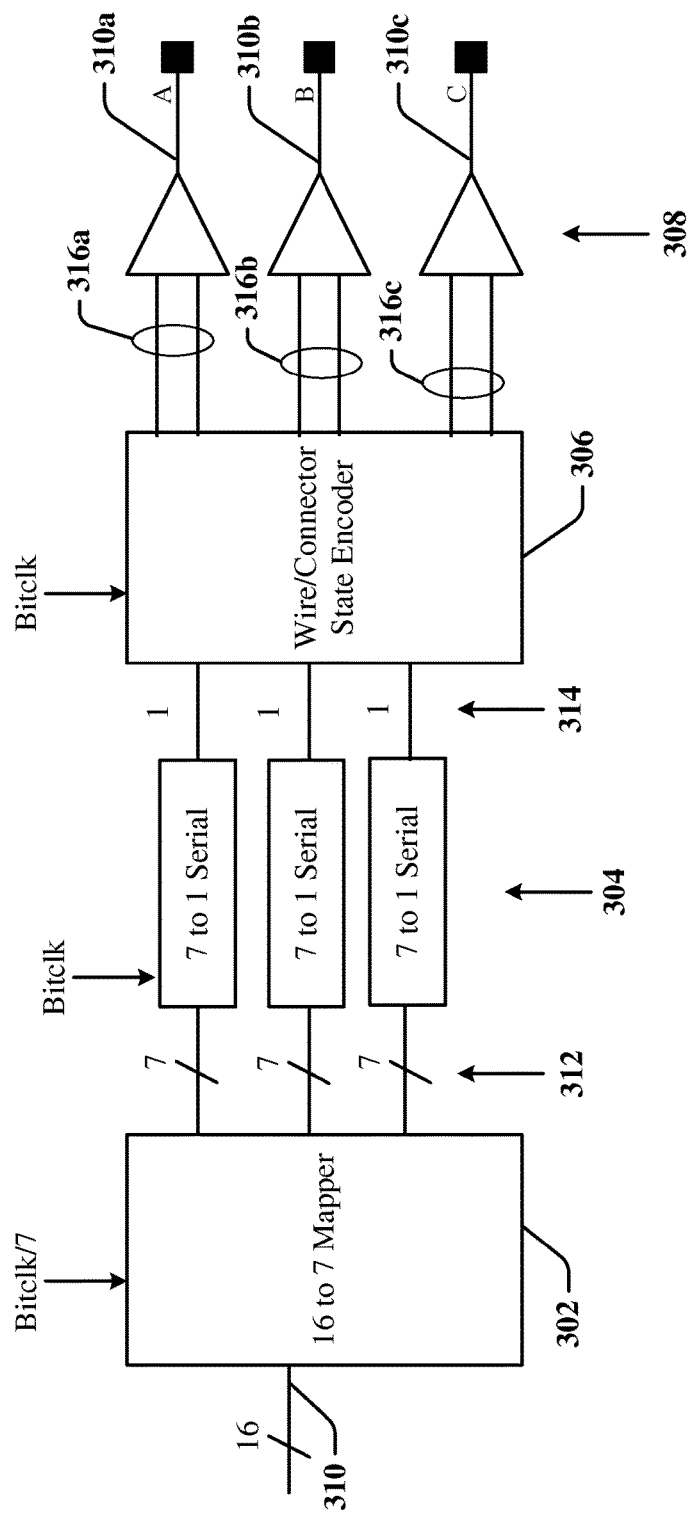
FIG. 3 illustrates a C-PHY data encoder.

FIG. 3 is a schematic diagram 300 illustrating a 3-wire, 3-phase polarity encoder that may be used to implement certain aspects of the communication link 220 depicted in FIG. 2. The example of 3-wire, 3-phase encoding is selected solely for the purpose of simplifying descriptions of certain aspects of the invention. The principles and techniques disclosed for 3-wire, 3-phase encoders can be applied in other configurations of M-wire, N-phase polarity encoders.

Signaling states defined for each of the 3 wires in a 3-wire, 3-phase polarity encoding scheme may include an undriven state, a positively driven state and a negatively driven state. The positively driven state and the negatively driven state may be obtained by providing a voltage differential between two of the signal wires 310a, 310b and/or 310c, and/or by driving a current through two of the signal wires 310a, 310b and/or 310c connected in series such that the current flows in different directions in the two signal wires 310a, 310b and/or 310c. The undriven state may be realized by placing an output of a driver of a signal wire 310a, 310b or 310c in a high-impedance mode. Alternatively, or additionally, an undriven state may be obtained on a signal wire 310a, 310b or 310c by passively or actively causing an "undriven" signal wire 310a, 310b or 310c to attain a voltage level that lies substantially halfway between positive and negative voltage levels provided on driven signal wires 310a, 310b and/or 310c. Typically, there is no significant current flow through an undriven signal wire 310a, 310b or 310c. Signaling states defined for a 3-wire, 3-phase polarity encoding scheme may be denoted using the three voltage or current states (+1, −1, and 0).

A 3-wire, 3-phase polarity encoder may employ line drivers 308 to control the signaling state of signal wires 310a, 310b and 310c. The drivers 308 may be implemented as unit-level current-mode or voltage-mode drivers. In one example, each driver 308 may receive sets of two or more of signals 316a, 316b and 316c that determine the output state of corresponding signal wires 310a, 310b and 310c. In one example, the sets of two signals 316a, 316b and 316c may include a pull-up signal (PU signal) and a pull-down signal (PD signal) that, when high, activate pull-up and pull down circuits that drive the signal wires 310a, 310b and 310c toward a higher level or lower level voltage, respectively. In this example, when both the PU signal and the PD signal are low, the signal wires 310a, 310b and 310c may be terminated to a mid-level voltage.

For each transmitted symbol interval in an M-wire, N-phase polarity encoding scheme, at least one signal wire 310a, 310b or 310c is in the midlevel/undriven (0) voltage or current state, while the number of positively driven (+1 voltage or current state) signal wires 310a, 310b or 310c is equal to the number of negatively driven (−1 voltage or current state) signal wires 310a, 310b or 310c, such that the sum of current flowing to the receiver is always zero. For each symbol, the state of at least one signal wire 310a, 310b or 310c is changed from the symbol transmitted in the preceding transmission interval.

In operation, a mapper 302 may receive and map 16 bit data 310 to 7 symbols 312. In the 3-wire example, each of the 7 symbols defines the states of the signal wires 310a, 310b and 310c for one symbol interval. The 7 symbols 312 may be serialized using parallel-to-serial converters 304 that provide a timed sequence of symbols 314 for each signal wire 310a, 310b and 310c. The sequence of symbols 314 is typically timed using a transmission clock. A 3-wire 3-phase encoder 306 receives the sequence of 7 symbols 314 produced by the mapper one symbol at a time and computes the state of each signal wire 310a, 310b and 310c for each symbol interval. The 3-wire encoder 306 selects the states of the signal wires 310a, 310b and 310c based on the current input symbol 314 and the previous states of signal wires 310a, 310b and 310c.

The use of M-wire, N-phase encoding permits a number of bits to be encoded in a plurality of symbols where the bits per symbol is not an integer. In the simple example of a 3-wire communications link, there are 3 available combinations of 2 wires, which may be driven simultaneously, and 2 possible combinations of polarity on the pair of wires that is driven, yielding 6 possible states. Since each transition occurs from a current state, 5 of the 6 states are available at every transition. The state of at least one wire is required to change at each transition. With 5 states, $\log_2(5) \cong 2.32$ bits may be encoded per symbol. Accordingly, a mapper may accept a 16-bit word and convert it to 7 symbols because 7 symbols carrying 2.32 bits per symbol can encode 16.24 bits. In other words, a combination of seven symbols that encode five states has $5^7$ (78,125) permutations. Accordingly, the 7 symbols may be used to encode the $2^{16}$ (65,536) permutations of 16 bits.

Figure 4:
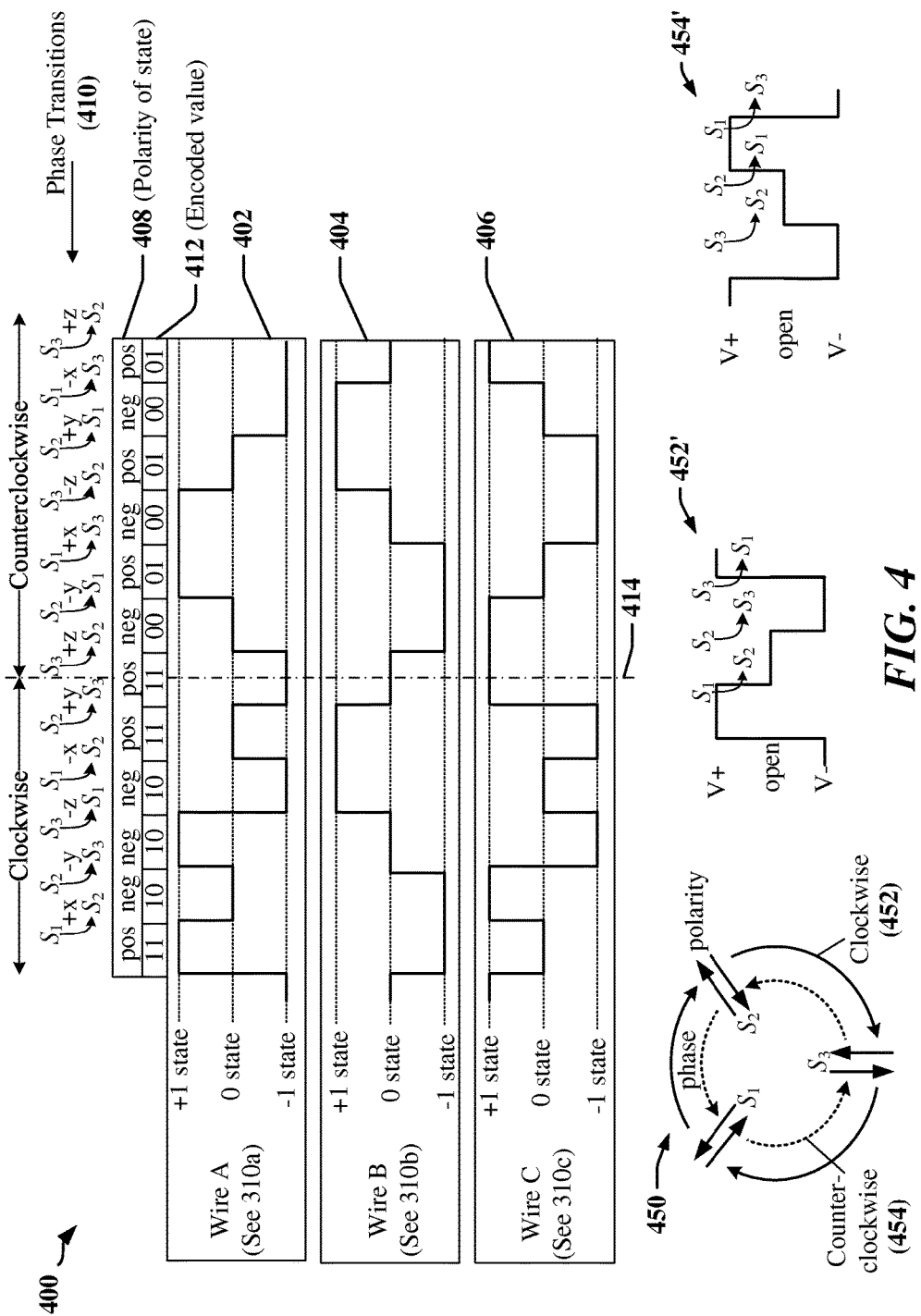
FIG. 4 illustrates signaling in a C-PHY encoded interface.

FIG. 4 includes an example of a timing chart 400 for signals encoded using a three-phase modulation data-encoding scheme, which is based on the circular state diagram 450. Information may be encoded in a sequence of signaling states where, for example, a wire or connector is in one of three phase states $S_1$, $S_2$ and $S_3$ defined by the state diagram 450. Each state may be separated from the other states by a 120° phase shift. In one example, data may be encoded in the direction of rotation of phase states on the wire or connector. The phase states in a signal may rotate in clockwise direction 452 and 452' or counterclockwise direction 454 and 454'. In the clockwise direction 452 and 454' for example, the phase states may advance in a sequence that includes one or more of the transitions from $S_1$ to $S_2$, from $S_2$ to $S_3$ and from $S_3$ to $S_1$. In the counterclockwise direction 454 and 454', the phase states may advance in a sequence that includes one or more of the transitions from St to $S_3$, from $S_3$ to $S_2$ and from $S_2$ to $S_1$. The three signal wires 310a, 310b and 310c carry different versions of the same signal, where the versions may be phase shifted by 120° with respect to one another. Each signaling state may be represented as a different voltage level on a wire or connector and/or a direction of current flow through the wire or connector. During each of the sequence of signaling states in a 3-wire system, each signal wire 310a, 310b and 310c is in a different signaling states than the other wires. When more than 3 signal wires 310a, 310b and 310c are used in a 3-phase encoding system, two or more signal wires 310a, 310b and/or 310c can be in the same signaling state at each signaling interval, although each state is present on at least one signal wire 310a, 310b and/or 310c in every signaling interval.

Information may be encoded in the direction of rotation at each phase transition 410, and the 3-phase signal may change direction for each signaling state. Direction of rotation may be determined by considering which signal wires 310a, 310b and/or 310c are in the '0' state before and after a phase transition, because the undriven signal wire 310a, 310b and/or 310c changes at every signaling state in a rotating three-phase signal, regardless of the direction of rotation.

The encoding scheme may also encode information in the polarity 408 of the two conductors 310a, 310b and/or 310c that are actively driven. At any time in a 3-wire implementation, exactly two of the conductors 310a, 310b, 310c are driven with currents in opposite directions and/or with a voltage differential. In a simple implementation, data may be encoded using two bit values 412, where one bit is encoded in the direction of phase transitions 410 and the second bit is encoded in the polarity 408 for the current state.

The timing chart 400 illustrates data encoding using both phase rotation direction and polarity. The curves 402, 404 and 406 relate to signals carried on three signal wires 310a, 310b and 310c, respectively for multiple phase states. Initially, the phase transitions 410 are in a clockwise direction and the most significant bit is set to binary '1,' until the rotation of phase transitions 410 switches at a time 414 to a counterclockwise direction, as represented by a binary '0' of the most significant bit. The least significant bit reflects the polarity 408 of the signal in each state.

According to certain aspects disclosed herein, one bit of data may be encoded in the rotation, or phase change in a 3-wire, 3-phase encoding system, and an additional bit may be encoded in the polarity of the two driven wires. Additional information may be encoded in each transition of a 3-wire, 3-phase encoding system by allowing transition to any of the possible states from a current state. Given 3 rotational phases and two polarities for each phase, 6 states are available in a 3-wire, 3-phase encoding system. Accordingly, 5 states are available from any current state. Accordingly, there may be $\log_2(5) \cong 2.32$ bits encoded per symbol (transition), which allows the mapper 302 to accept a 16-bit word and encode it in 7 symbols.

N-Phase data transfer may use more than three wires provided in a communication medium, such as a bus. The use of additional signal wires that can be driven simultaneously provides more combinations of states and polarities and allows more bits of data to be encoded at each transition between states. This can significantly improve throughput of the system, and reduce the power consumption over approaches that use multiple differential pairs to transmit data bits, while providing increased bandwidth.

In one example, an encoder may transmit symbols using 6 wires with 2 pairs of wires driven for each state. The 6 wires may be labeled A through F, such that in one state, wires A and F are driven positive, wires B and E negative, and C and D are undriven (or carry no current). For six wires, there may be:

$$C(6, 4) = \frac{6!}{(6-4)! \cdot 4!} = 15$$

possible combinations of actively driven wires, with:

$$C(4, 2) = \frac{4!}{(4-2)! \cdot 2!} = 6$$

different combinations of polarity for each phase state.

The 15 different combinations of actively driven wires may include:

| | | | | |
|---|---|---|---|---|
| A B C D | A B C E | A B C F | A B D E | A B D F |
| A B E F | A C D E | A C D F | A C E F | A D E F |
| B C D E | B C D F | B C E F | B D E F | C D E F |

Of the 4 wires driven, the possible combinations of two wires driven positive (and the other two must be negative). The combinations of polarity may include:

| | | | | | |
|---|---|---|---|---|---|
| + + − − | + − − + | + − + − | − + − + | − + + − | − − + + |

Accordingly, the total number of different states may be calculated as 15×6=90. To guarantee a transition between symbols, 89 states are available from any current state, and the number of bits that may be encoded in each symbol may be calculated as: $\log_2(89) \cong 6.47$ bits per symbol. In this example, a 32-bit word can be encoded by the mapper into 5 symbols, given that 5×6.47=32.35 bits.

The general equation for the number of combinations of wires that can be driven for a bus of any size, as a function of the number of wires in the bus and number of wires simultaneously driven:

$$C(N_{wires}, N_{driven}) = \frac{N_{wires}!}{(N_{wires} - N_{driven})! \cdot N_{driven}!}$$

one equation for calculating the number of combinations of polarity for the wires being driven is:

$$C\left(N_{driven}, \frac{N_{driven}}{2}\right) = \frac{N_{driven}!}{\left(\left(\frac{N_{driven}}{2}\right)!\right)^2}$$

The equivalent number of bits per symbol may be stated as:

$$\log_2\left(C(N_{wires}, N_{driven}) \cdot C\left(N_{driven}, \frac{N_{driven}}{2}\right) - 1\right)$$

Figure 5:
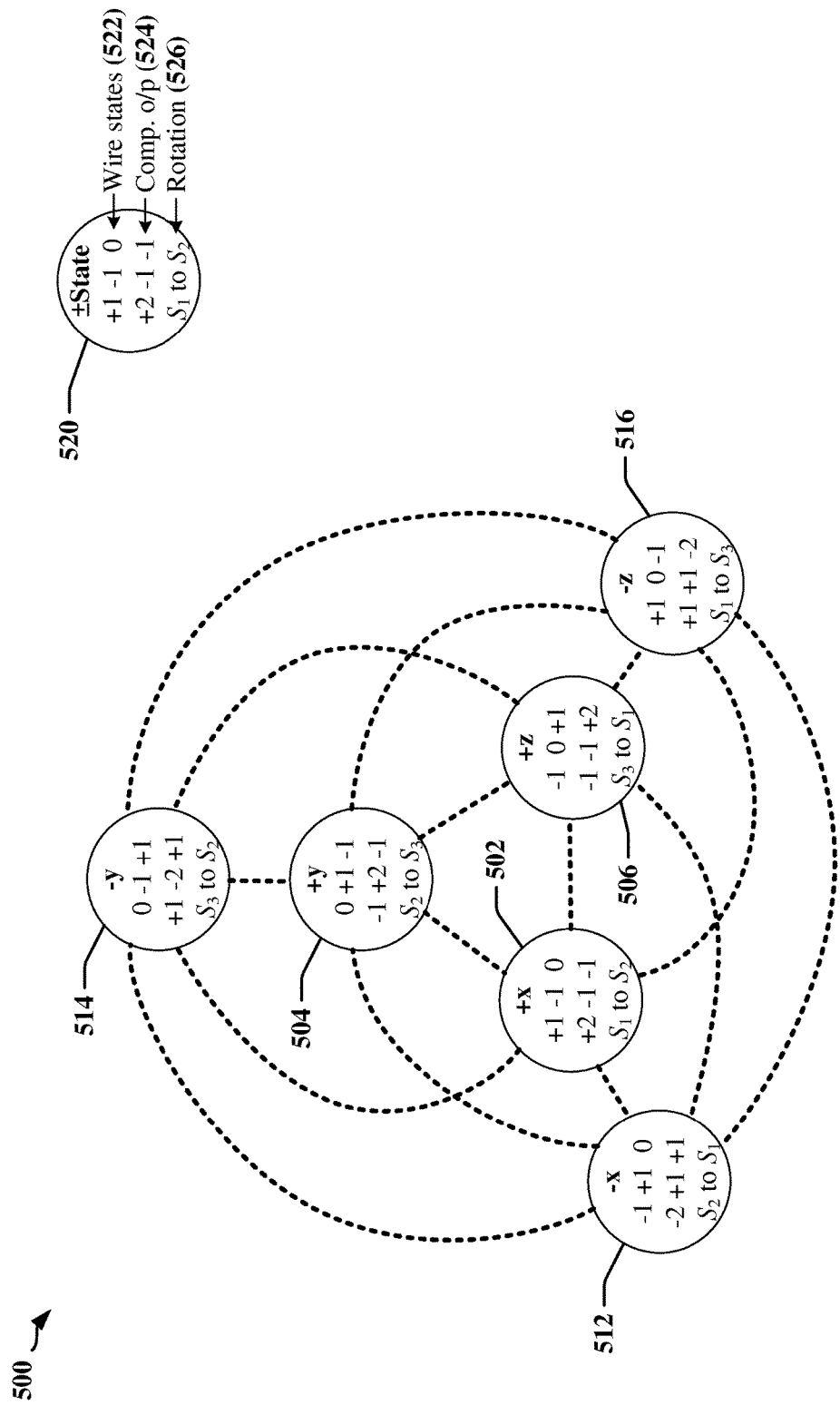
FIG. 5 is a state diagram illustrating potential state transitions in a C-PHY encoded interface.

FIG. 5 is a state diagram 500 illustrating 6 states and 30 possible state transitions in one example of a 3-wire, 3-phase communication link. The possible states 502, 504, 506, 512, 514 and 516 in the state diagram 500 include and expand on the states shown in the diagram 450 of FIG. 4. As shown in the exemplar of a state element 520, each state 502, 504, 506, 512, 514 and 516 in the state diagram 500 includes a field 522 showing the voltage state of signals A, B and C (transmitted on signal wires 310a, 310b and 310c respectively), a field 524 showing the result of a subtraction of wire voltages by differential receivers (see the differential receivers 602 of FIG. 6, for example), respectively and a field 526 indicating the direction of rotation. For example, in state 502 (+x) wire A=+1, wire B=−1 and wire C=0, yielding output of differential receiver 702a (A-B)=+2, differential receiver 702b (B-C)=−1 and differential receiver 702c (C-A)=+1. As illustrated by the state diagram, transition decisions taken by phase change detect circuitry in a receiver are based on 5 possible levels produced by differential receivers, which include −2, −1, 0, +1 and +2 voltage states.

Figure 6:
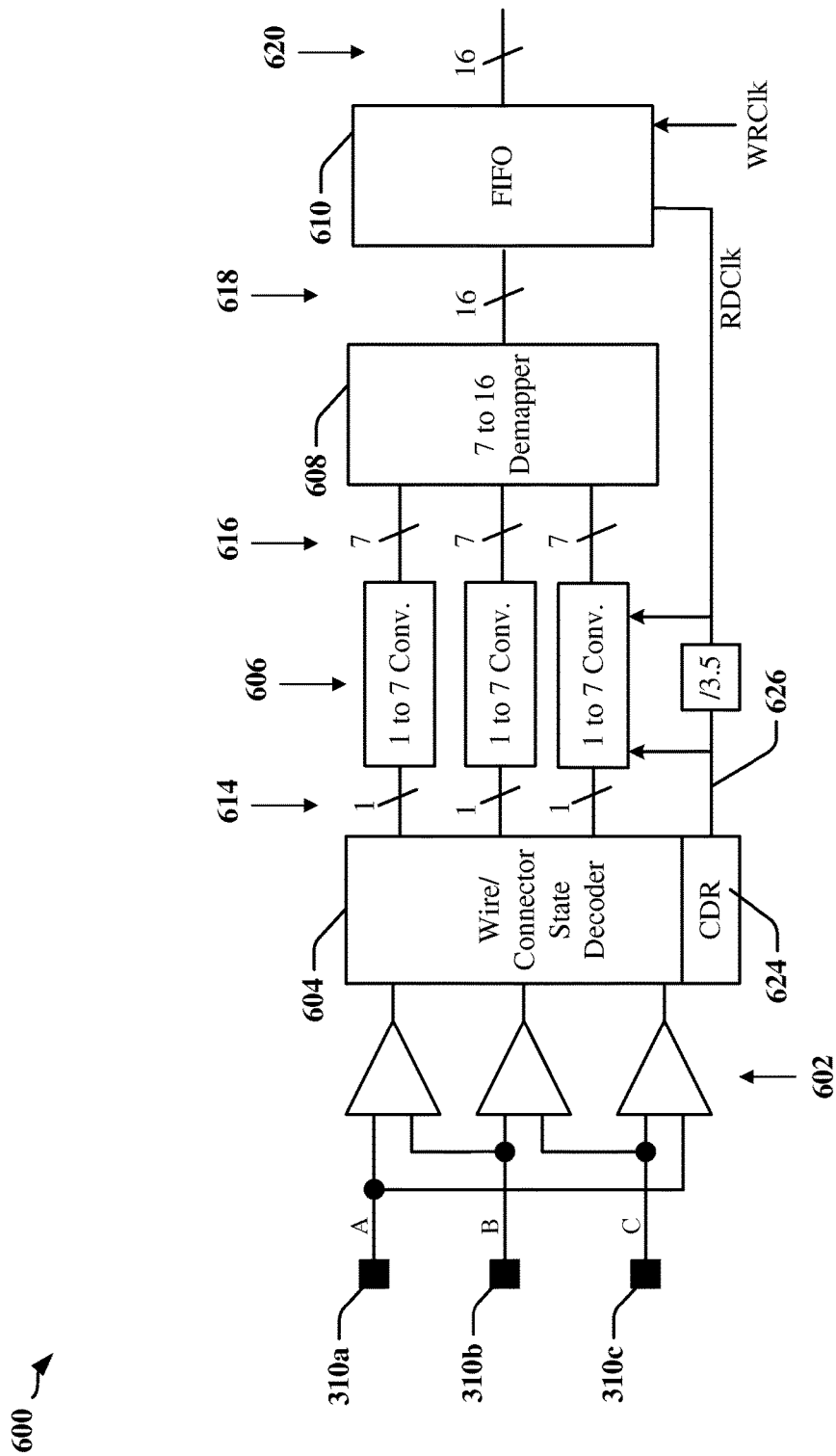
FIG. 6 illustrates a C-PHY decoder.

FIG. 6 is a diagram illustrating certain aspects of a 3-wire, 3-phase decoder 600. Differential receivers 602 and a wire state decoder 604 are configured to provide a digital representation of the state of the three transmission lines (e.g., the signal wires 310a, 310b and 310c illustrated in FIG. 3), with respect to one another, and to detect changes in the state of the three transmission lines compared to the state transmitted in the previous symbol period. Seven consecutive states are assembled by the serial-to-parallel convertors 606 to obtain a set of 7 symbols to be processed by the demapper 608. The demapper 608 produces 16 bits of data that may be buffered in a first-in-first-out (FIFO) register 610.

The wire state decoder 604 may extract a sequence of symbols 614 from phase encoded signals received on the signal wires 310a, 310b and 310c. The symbols 614 are encoded as a combination of phase rotation and polarity as disclosed herein. The wire state decoder may include a CDR circuit 624 that extracts a clock 626 that can be used to reliably capture symbols from the signal wires 310a, 310b and 310c. A transition occurs on least one of the signal wires 310a, 310b and 310c at each symbol boundary and the CDR circuit 624 may be configured to generate the clock 626 based on the occurrence of a transition or multiple transitions. An edge of the clock may be delayed to allow time for all signal wires 310a, 310b and 310c to have stabilized and to thereby ensure that the current symbol is captured for decoding purposes.

Jitter in C-PHY 3-Phase Interfaces

A C-PHY 3-phase transmitter includes drivers that provide high, low and middle-level voltages onto the transmit channel. This results in some variable transitions between consecutive symbol intervals. Low-to-high and high-to-low voltage transitions may be referred to as full-swing transitions, while low-to-middle and high-to-middle voltage transitions may be referred to as half-swing transitions. Different types of transitions may have different rise or fall times, and may result in different zero crossings at the receiver. These differences can result in "encoding jitter," which may impact link signal integrity performance.

Figure 7:
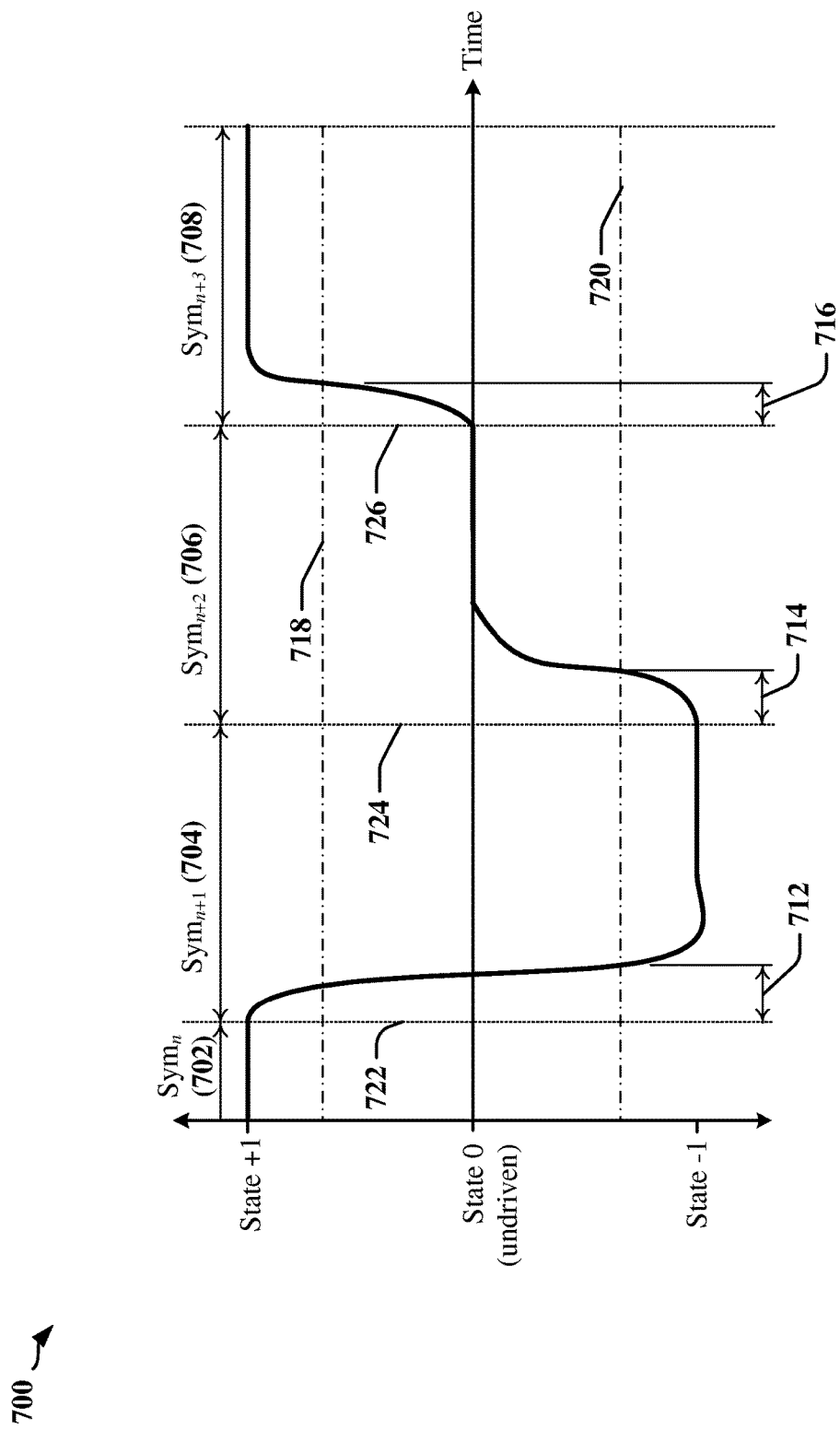
FIG. 7 is a simplified example of the effects of signal rise times on transition detection in a C-PHY decoder.

FIG. 7 is a simplified timing diagram 700 that illustrates certain aspects of transition variability at the output of a C-PHY 3-phase transmitter. Variability in signal transition times may be attributed to the existence of the different voltage and/or current levels used in 3-phase signaling. The timing diagram 700 illustrates transition times in a single signal wire 310a, 310b or 310c. A first symbol $Sym_n$ 702 is transmitted in a first symbol interval that ends at a time 722 when a second symbol $Sym_{n+1}$ 724 is transmitted in a second symbol interval. The second symbol interval may end at time 726 when a third symbol $Sym_{n+2}$ 706 is transmitted in the third symbol interval, which ends when a fourth symbol $Sym_{n+3}$ 708 is transmitted in a fourth symbol interval. The transition from a state determined by the first symbol 702 to the state corresponding to the second symbol 704 may be detectable after a delay 712 attributable to the time taken for voltage in the signal wire 310a, 310b or 310c to reach a threshold voltage 718 and/or 720. The threshold voltages may be used to determine the state of the signal wire 310a, 310b or 310c. The transition from a state determined by the second symbol 704 to the state for the third symbol 706 may be detectable after a delay 714 attributable to the time taken for voltage in the signal wire 310a, 310b or 310c to reach one of the threshold voltages 718 and/or 720. The transition from a state determined by the third symbol 706 to the state for the fourth symbol 708 may be detectable after a delay 716 attributable to the time taken for voltage in the signal wire 310a, 310b or 310c to reach a threshold voltage 718 and/or 720. The delays 712, 714 and 716 may have different durations, which may be attributable in part to the different voltage or current levels associated with the 3 states and consequent different transition magnitudes. These differences may contribute to jitter and other issues in C-PHY 3-phase receiver.

Figure 8:
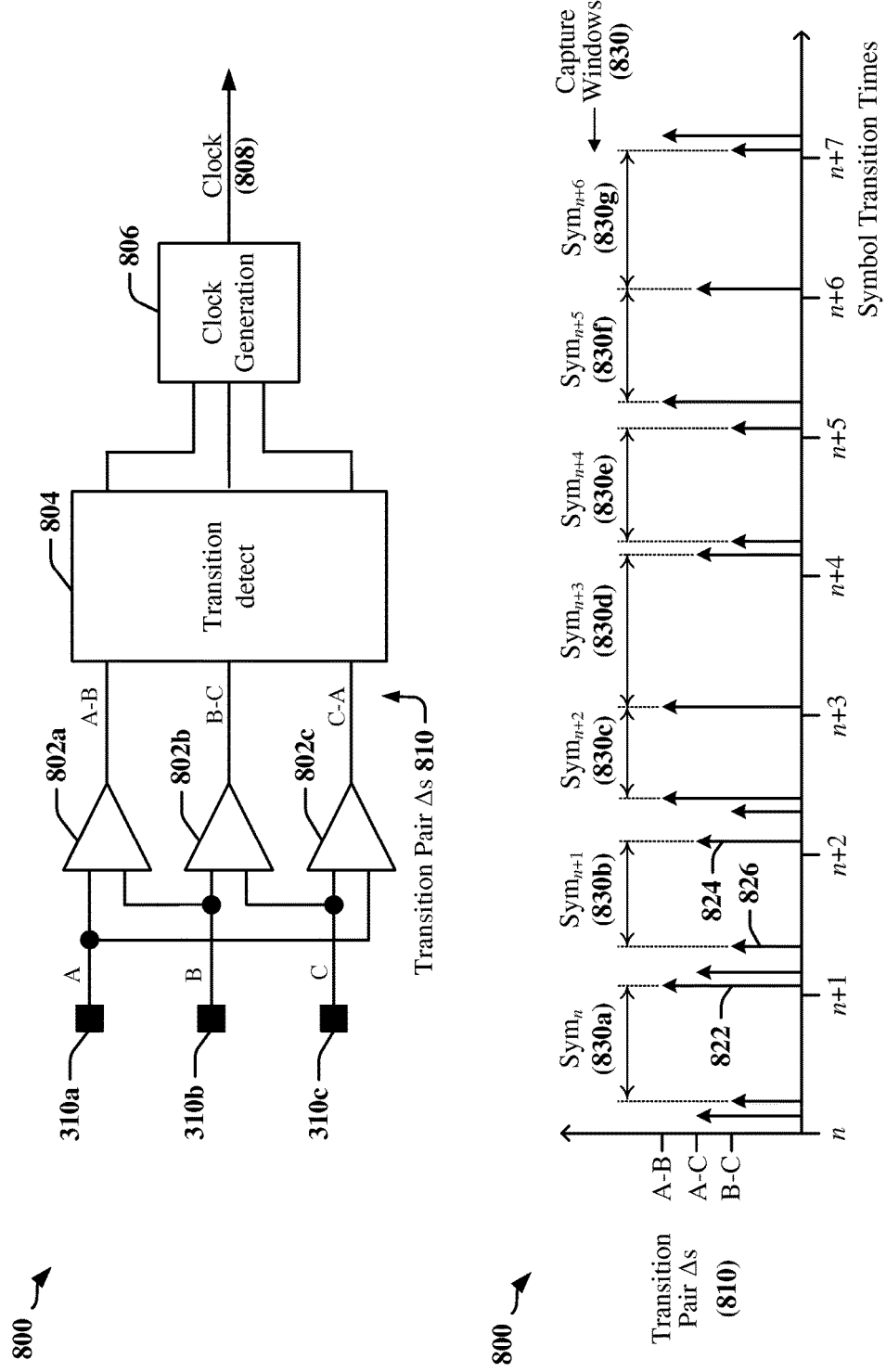
FIG. 8 illustrates transition detection in a C-PHY decoder.

FIG. 8 includes a block schematic 800 illustrating certain aspects of CDR circuits of a receiver in a C-PHY 3-phase interface. A set of differential receivers 802a, 802b and 802c is configured to generate a set of difference signals 810 by comparing each of the three signal wires 310a, 310b and 310c in a trio with the other of the three signal wires 310a, 310b and 310c in the trio. In the example depicted, a first differential receiver 802a compares the states of signal wires 310a and 310b, a second differential receiver 802b compares the states of signal wires 310b and 310c and a third differential receiver 802c compares the states of signal wires 310a and 310c. Accordingly, transition detection circuitry 804 can be configured to detect occurrence of a phase change because the output of at least one of the differential receivers 802a, 802b and 802c changes at the end of each symbol interval.

Certain transitions between transmitted symbols may be detectable by a single differential receiver 802a, 802b or 802c, while other transitions may be detected by two or more of the differential receivers 802a, 802b and 802c. In one example the states, or relative states of two wires may be unchanged after a transition and the output of a corresponding differential receiver 802a, 802b or 802c may also be unchanged after the phase transition. In another example, both wires in a pair of signal wires 310a, 310b and/or 310c may be in the same state in a first time interval and both wires may be in a same second state in a second time interval and the corresponding differential receiver 802a, 802b or 802c may be unchanged after the phase transition. Accordingly, a clock generation circuit 806 may include a transition detect circuit 804 and/or other logic to monitor the outputs of all differential receivers 802a, 802b and 802c in order to determine when a phase transition has occurred. The clock generation circuit may generate a receive clock signal 808 based on detected phase transitions.

Changes in signaling states of the 3 wires may be detected at different times for different combinations of the signal wires 310a, 310b and/or 310c. The timing of detection of signaling state changes may vary according to the type of signaling state change that has occurred. The result of such variability is illustrated in the simplified timing chart 850 of FIG. 8. Markers 822, 824 and 826 represent occurrences of transitions in the difference signals 810 provided to the transition detection circuit 804. The markers 822, 824 and 826 are assigned different heights in the timing chart 850 for clarity of illustration only, and the relative heights of the markers 822, 824 and 826 are not intended to show a specific relationship to voltage or current levels, polarity or weighting values used for clock generation or data decoding. The timing chart 850 illustrates the effect of timing of transitions associated with symbols transmitted in phase and polarity on the three signal wires 310a, 310b and 310c. In the timing chart 850, transitions between some symbols may result in variable capture windows 830a, 830b, 830c, 830d, 830e, 830f and/or 830g (collectively symbol capture windows 830) during which symbols may be reliably captured. The number of state changes detected and their relative timing can result in jitter on the clock signal 808.

Variability in the sizes of the symbol windows 830 and jitter may be caused in part by the electrical characteristics of the signal wires 310a, 310b and 310c, as illustrated in the timing diagram 700 depicted in FIG. 7. The throughput of a C-PHY communications link may be affected by duration and variability in signal transition times. For example, variability in detection circuits may be caused by manufacturing process tolerances, variations and stability of voltage and current sources and operating temperature. Certain impediments to accomplishing higher data rates are attributable to channel bandwidth and its increased effect on higher frequency components of digital signals. For example, attenuation of the higher frequencies can affect signal rise and fall times. In conventional line drivers, pre-emphasis circuits may be provided whereby the pre-emphasis circuits operate to increase the detection of transitions at the receiver. Some pre-emphasis circuits may affect the timing of signals by initiating a transition early or terminating a transition late. Other pre-emphasis circuits may increase the current flow provided by the driver during transitions.

Figure 9:
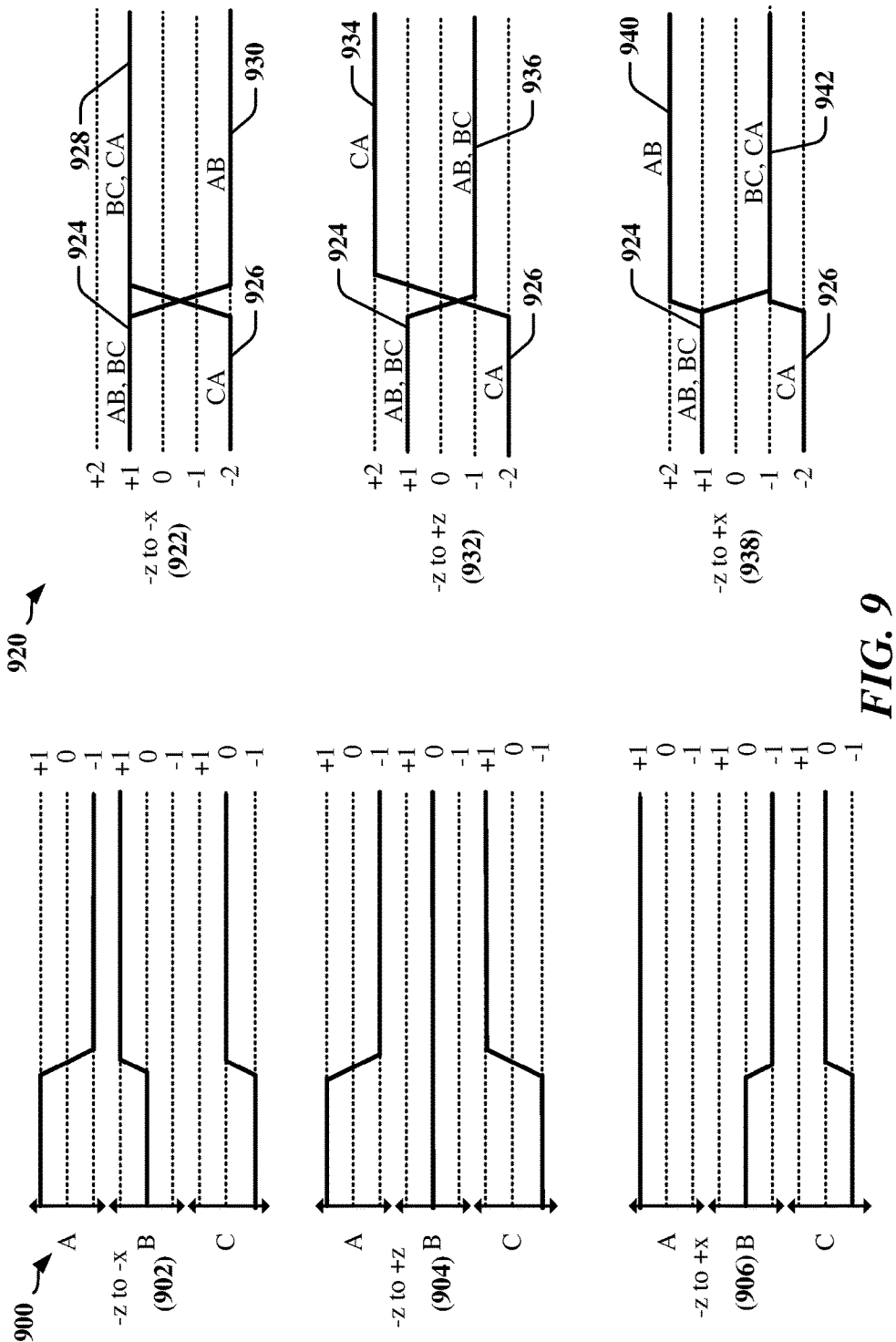
FIG. 9 illustrates one example of signal transitions occurring between pairs of consecutive symbols transmitted on a C-PHY interface.

FIG. 9 includes timing charts 900 and 920 representative of certain examples of transitions from a first signaling state to a second signaling state between certain consecutive symbols. The signaling state transitions illustrated in the timing charts 900 and 920 are selected for illustrative purposes, and other transitions and combinations of transitions can occur in the MIPI Alliance C-PHY interface. The timing charts 900 and 920 relate to an example of a 3-wire, 3-phase communications link, in which multiple receiver output transitions may occur at each symbol interval boundary due to differences in rise and fall time between the signal levels on the trio of wires. With reference also to FIG. 8, the first timing charts 900 illustrate the signaling states of the trio of signal wires 310a, 310b and 310c (A, B, and C) before and after a transition and second timing charts 920 illustrate the outputs of the differential receivers 802a, 802b and 802c, which provides difference signals 810 representative of the differences between signal wires 310a, 310b and 310c. In many instances, a set of differential receivers 802a, 802b and 802c may be configured to capture transitions by comparing different combinations for two signal wires 310a, 310b and 310c. In one example, these differential receivers 802a, 802b and 802c may be configured to produce outputs by determining the difference (e.g. by subtraction) of their respective input voltages.

In each of the examples shown in the timing charts 900 and 920, the initial symbol (−z) 516 (see FIG. 8) transitions to a different symbol. As shown in the timing charts 902, 904 and 906 signal A is initially in a +1 state, signal B is in a 0 state and signal C is in the −1 state. Accordingly, the differential receivers 802a, 802b initially measure a +1 difference 924 and the differential receiver 802c measures a −2 difference 926, as shown in the timing charts 922, 932, 938 for the differential receiver outputs.

In a first example corresponding to the timing charts 902, 922, a transition occurs from symbol (−z) 516 to symbol (−x) 512 (see FIG. 8) in which signal A transitions to a −1 state, signal B transitions to a +1 state and signal C transitions to a 0 state, with the differential receiver 802a transitioning from +1 difference 924 to a −2 difference 930, differential receiver 802b remaining at a +1 difference 924, 928 and differential receiver 802c transitioning from −2 difference 926 to a +1 difference 928.

In a second example corresponding to the timing charts 904, 932, a transition occurs from symbol (−z) 516 to symbol (+z) 506 in which signal A transitions to a −1 state, signal B remains at the 0 state and signal C transitions to a +1 state, with two differential receivers 802a and 802b transitioning from +1 difference 924 to a −1 difference 936, and differential receiver 802c transitioning from −2 difference 926 to a +2 difference 934.

In a third example corresponding to the timing charts 906, 938, a transition occurs from symbol (−z) 516 to symbol (+x) 502 in which signal A remains at the +1 state, signal B transitions to the −1 state and signal C transitions to a 0 state, with the differential receiver 802a transitioning from a +1 difference 924 to a +2 difference 940, the differential receiver 802b transitioning from a +1 difference 924 to a −1 difference 942, and the differential receiver 802c transitioning from −2 difference 926 to a −1 difference 942.

These examples illustrate transitions in difference values spanning 0, 1, 2, 3, 4 and 5 levels. Pre-emphasis techniques used for typical differential or single-ended serial transmitters were developed for two level transitions and may introduce certain adverse effects if used on a MIPI Alliance C-PHY signal. In particular, a pre-emphasis circuit that overdrives a signal during transitions may cause overshoot during transitions spanning 1 or 2 levels and may cause false triggers to occur in edge sensitive circuits.

Figure 10:
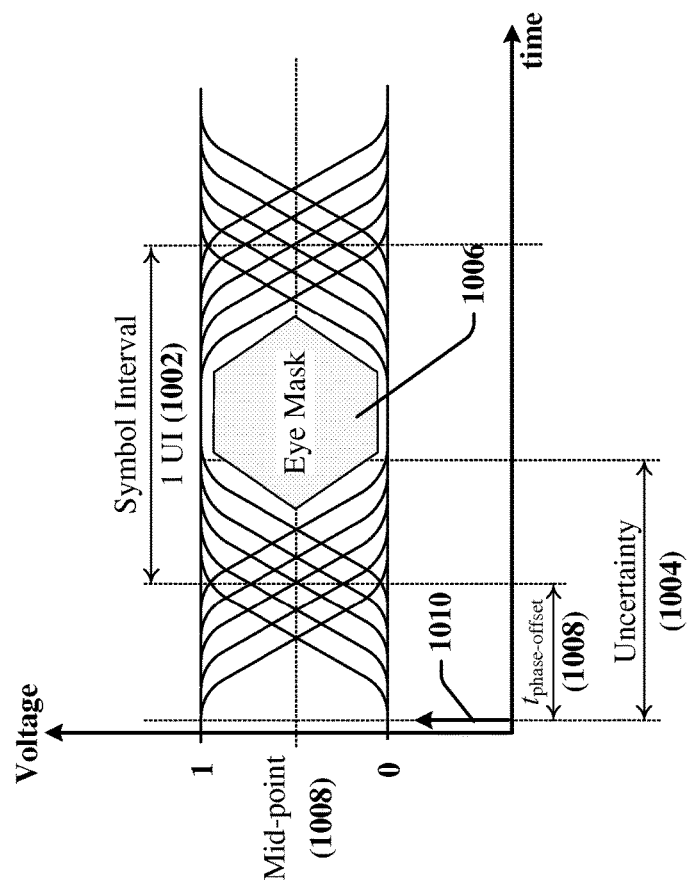
FIG. 10 includes a simple eye-pattern illustrating transition and eye regions.

FIG. 10 illustrates an eye pattern 1000 generated as an overlay of multiple symbol intervals, including a single symbol interval 1002. A signal transition region 1004 represents a time period of uncertainty at the boundary between two symbols where variable signal rise times prevent reliable decoding. State information may be determined reliably in a region defined by an eye mask 1006 within an "eye opening" that represents the time period in which the symbol is stable and can be reliably received and decoded. The eye mask 1006 masks off a region in which zero crossings do not occur, and the eye mask is used by the decoder to prevent multiple clocking due to the effect of subsequent zero crossings at the symbol interval boundary that follow the first signal zero crossing.

The concept of periodic sampling and display of the signal is useful during design, adaptation and configuration of systems which use a clock-data recovery circuit that re-creates the received data-timing signal using frequent transitions appearing in the received data. A communication system based on Serializer/Deserializer (SERDES) technology is an example of a system where an eye pattern 1000 can be utilized as a basis for judging the ability to reliably recover data based on the eye opening of the eye pattern 1000.

An M-wire N-Phase encoding system, such as a 3-wire, 3-phase encoder may encode a signal that has at least one transition at every symbol boundary and the receiver may recover a clock using those guaranteed transitions. The receiver may require reliable data immediately prior to the first signal transition at a symbol boundary, and must also be able to reliably mask any occurrences of multiple transitions that are correlated to the same symbol boundary. Multiple receiver transitions may occur due to slight differences in rise and fall time between the signals carried on the M-wires (e.g. a trio of wires) and due to slight differences in signal propagation times between the combinations of signal pairs received (e.g. A-B, B-C, and C-A outputs of differential receivers 802a, 802b and 802c of FIG. 6).

Figure 11:
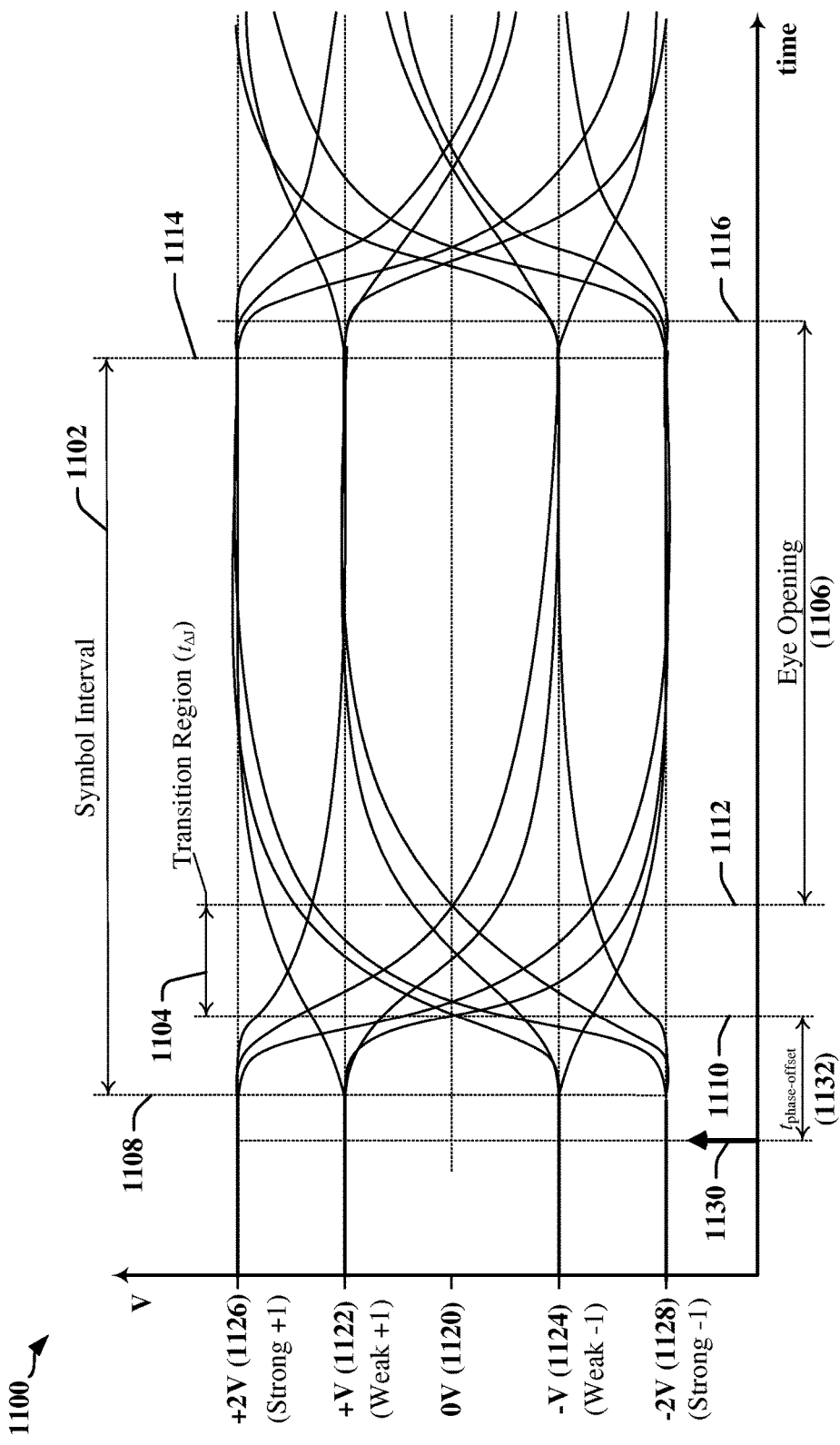
FIG. 11 illustrates an example of an eye-pattern generated for a C-PHY 3-Phase signal.

FIG. 11 illustrates an example of an eye-pattern 1100 generated for a C-PHY 3-phase signal. The eye-pattern 1100 may be generated from an overlay of multiple symbol intervals 1102. The eye-pattern 1100 may be produced using a fixed and/or symbol-independent trigger 1130. The eye-pattern 1100 includes an increased number of voltage levels 1120, 1122, 1124, 1126, 1128 that may be attributed to the multiple voltage levels measured by the differential receivers 802a, 802b, 802c an N-phase receiver circuit (see FIG. 8). In the example, the eye-pattern 1100 may correspond to possible transitions in 3-wire, 3-phase encoded signals provided to the differential receivers 802a, 802b, and 802c. The three voltage levels may cause the differential receivers 802a, 802b, and 802c to generate strong voltage levels 1126, 1128 and weak voltage levels 1122, 1124 for both positive and negative polarities. Typically, only one signal wire 310a, 310b and 310c is undriven in any symbol and the differential receivers 802a, 802b, and 802c do not produce a 0 state (here, 0 Volts) output. The voltages associated with strong and weak levels need not be evenly spaced with respect to a 0 Volts level. For example, the weak voltage levels 1122, 1124 represent a comparison of voltages that may include the voltage level reached by an undriven signal wire 310a, 310b and 310c. The eye-pattern 1100 may overlap the waveforms produced by the differential receivers 802a, 802b, and 802c because all three pairs of signals are considered simultaneously when data is captured at the receiving device. The waveforms produced by the differential receivers 802a, 802b, and 802c are representative of difference signals 810 representing comparisons of three pairs of signals (A-B, B-C, and C-A).

Drivers, receivers and other devices used in a C-PHY 3-Phase decoder may exhibit different switching characteristics that can introduce relative delays between signals received from the three wires. Multiple receiver output transitions may be observed at each symbol interval boundary 1108 and/or 1114 due to slight differences in the rise and fall time between the three signals of the trio of signal wires 310*a*, 310*b*, 310*c* and due to slight differences in signal propagation times between the combinations of pairs of signals received from the signal wires 310*a*, 310*b*, 310*c*. The eye-pattern 1100 may capture variances in rise and fall times as a relative delay in transitions near each symbol interval boundary 1108 and 1114. The variances in rise and fall times may be due to the different characteristics of the 3-Phase drivers. Differences in rise and fall times may also result in an effective shortening or lengthening of the duration of the symbol interval 1102 for any given symbol.

A signal transition region 1104 represents a time, or period of uncertainty, where variable signal rise times prevent reliable decoding. State information may be reliably determined in an "eye opening" 1106 representing the time period in which the symbol is stable and can be reliably received and decoded. In one example, the eye opening 1106 may be determined to begin at the end 1112 of the signal transition region 1104, and end at the symbol interval boundary 1114 of the symbol interval 1102. In the example depicted in FIG. 11, the eye opening 1106 may be determined to begin at the end 1112 of the signal transition region 1104, and end at a time 1116 when the signaling state of the signal wires 310*a*, 310*b*, 310*c* and/or the outputs of the three differential receivers 802*a*, 802*b* and 802*c* have begun to change to reflect the next symbol.

The maximum speed of a communication link 220 configured for N-Phase encoding may be limited by the duration of the signal transition region 1104 compared to the eye opening 1106 corresponding to the received signal. The minimum period for the symbol interval 1102 may be constrained by tightened design margins associated with the CDR circuit 624 in the decoder 600 illustrated in FIG. 6, for example. Different signaling state transitions may be associated with different variations in signal transition times corresponding to two or more signal wires 310*a*, 310*b* and/or 310*c*, thereby causing the outputs of the differential receivers 802*a*, 802*b* and 802*c* in the receiving device to change at different times and/or rates with respect to the symbol interval boundary 1108, where the inputs of the differential receivers 802*a*, 802*b* and 802*c* begin to change. A delay element may be provided in the CDR circuit 624 to accommodate possible large variations in received signal transition times at the outputs of two or more of the differential receivers 802*a*, 802*b* and 802*c*. The delay element may be provided in one or more of a state change-detect circuit such as the transition detect circuit 804 illustrated in FIG. 8, and/or the clock generation circuit 806 shown in FIG. 8. In one example, the delay element may have a minimum delay period that exceeds the duration of the transition region 1104. The maximum delay time provided by this delay element may not extend beyond the time 1116 when the eye opening 1106 closes. In some instances, the maximum delay time provided by the delay element may not extend beyond the commencement of the next symbol interval at the symbol interval boundary 1114 corresponding to the termination of the symbol interval 1102. At faster data rates, the eye opening 1106 can become small in comparison to the symbol interval 1102 and the effect of symbol transition variability may be determinative of the maximum symbol transmission rate.

The duration of any single transition is unlikely to span the full range of the signal transition region ($t_{A\prime}$) 1104, since it is unlikely that a minimum possible signal transition time and a maximum possible transition time occurs during a single symbol transition. In one example, the signal transition region 1104 may be bounded by the time of the first zero crossing 1110 detected at the output of a differential receiver 802*a*, 802*b*, or 802*c* and the time of the last zero crossing at the end 1112 of the signal transition region 1104 detected at the output of a differential receiver 802*a*, 802*b*, or 802*c*, for all possible symbol transitions. The transition times observed at the outputs of the differential receiver 802*a*, 802*b*, and 802*c* may correspond to the times taken for the voltage at the connectors and/or signal wires 310*a*, 310*b* or 310*c* to reach a signaling state after a change in one or more inputs of the drivers 308 in a transmitter.

The longest possible transition time may be determined by the characteristics of one or more of the signal wires and/or signal wires 310*a*, 310*b* or 310*c* and the type of state transition involved. In one example, the longest possible transition time may be determined by the rise or fall time of one or more signals. Rise and fall times may be determined by the nature and voltage levels of the original and/or the final states. Typically, the longest possible transition time corresponds to a transition between an actively driven state and an undriven state.

A high value of $t_{A\prime}$ for the signal transition region 1104 relative to the symbol interval 1102 can result in increased design difficulty, associated with the CDR circuit 624 or clock generation circuit 806. For example, the clock generation circuit 806 may employ a delay element or timer that is triggered by the first zero crossing of the outputs of the three differential receiver 802*a*, 802*b* and 802*c*. The state of the outputs of all three differential receivers 802*a*, 802*b* and 802*c* may not be safely sampled until all of the differential receivers 802*a*, 802*b* and 802*c* have reached their final state, which may be defined by the end 1112 of the transition region. Accordingly, the timer may preferably expire shortly after the end 1112 of the signal transition region 1104, at which time the clock generation circuit 806 may output a clock edge that is used to sample the outputs of the three differential receivers 802*a*, 802*b* and 802*c*.

In some devices, delay elements in the CDR circuit 624 can be afflicted by variations in manufacturing process, circuit supply voltage, and die temperature (PVT) variation, and may generate delays that vary significantly. In such systems, the nominal operating condition of the CDR circuit 624 is generally set by design to generate a clock edge somewhere in the middle of the eye opening 1106 in order to ensure that a clock edge occurs after the end 1112 of the signal transition region 1104 and prior to the commencement of the transition region to the next symbol, even under worst case PVT effects. Difficulty can arise in designing a CDR circuit 624 that guarantees a clock edge within the eye opening 1106 when the signal transition region 1104 is large compared to the eye opening 1106. For example, a typical delay element may produce a delay value that changes by a factor of 2 over all PVT conditions, and the eye opening 1106 must be larger than the signal transition region 1104 in order that a non-adjustable delay value can be chosen.

In some instances, the duration of the signal transition region 1104 may be calculated based on the maximum timing between a change in input to one or more drivers 308 of a transmitting circuit (see FIG. 3) and corresponding transitions observed or expected at the outputs of differential receivers 602 in a receiver (see FIG. 6). In other instances, a modified transition region may be determined at the outputs of the receivers 602 as the maximum difference between the time 118 of a first transition at the output of one of the receivers 602 and the time corresponding to the terminating symbol interval boundary 1114 of the symbol interval 1102 of the last transition at the output of the other receivers 602, for all symbol transitions.

Time-Based Equalization for C-PHY 3-Phase Interfaces

According to certain aspects disclosed herein, transmit encoding jitter may be reduced and link performance may be improved through the use of time-based equalization that may increase the horizontal eye opening observed at a receiver. In some examples, a 3-phase transmitter adapted according to certain aspects disclosed herein, may force all wires in a trio to a common voltage for a short period of time at each transition between symbols.

Time-based equalization can provide lower-power solutions to jitter than other techniques including such as amplitude-based channel equalization approaches. For example, pre-emphasis schemes may reduce source resistance to obtain larger swings, and de-emphasis schemes may introduce contention on output pads to reduce the signal swing and de-emphasize the direct current (DC) component in the transmitted signal. Pre-emphasis and de-emphasis schemes may alter the transmitter impedance, which can increase reflections in the transmission channel. The use of time-based equalization, as disclosed herein, maintains transmitter impedance unaltered and avoids adding latency in the data transmission path that can arise from processing overhead needed to detect patterns of signals that activate pre-emphasis or de-emphasis circuits.

Figure 12:
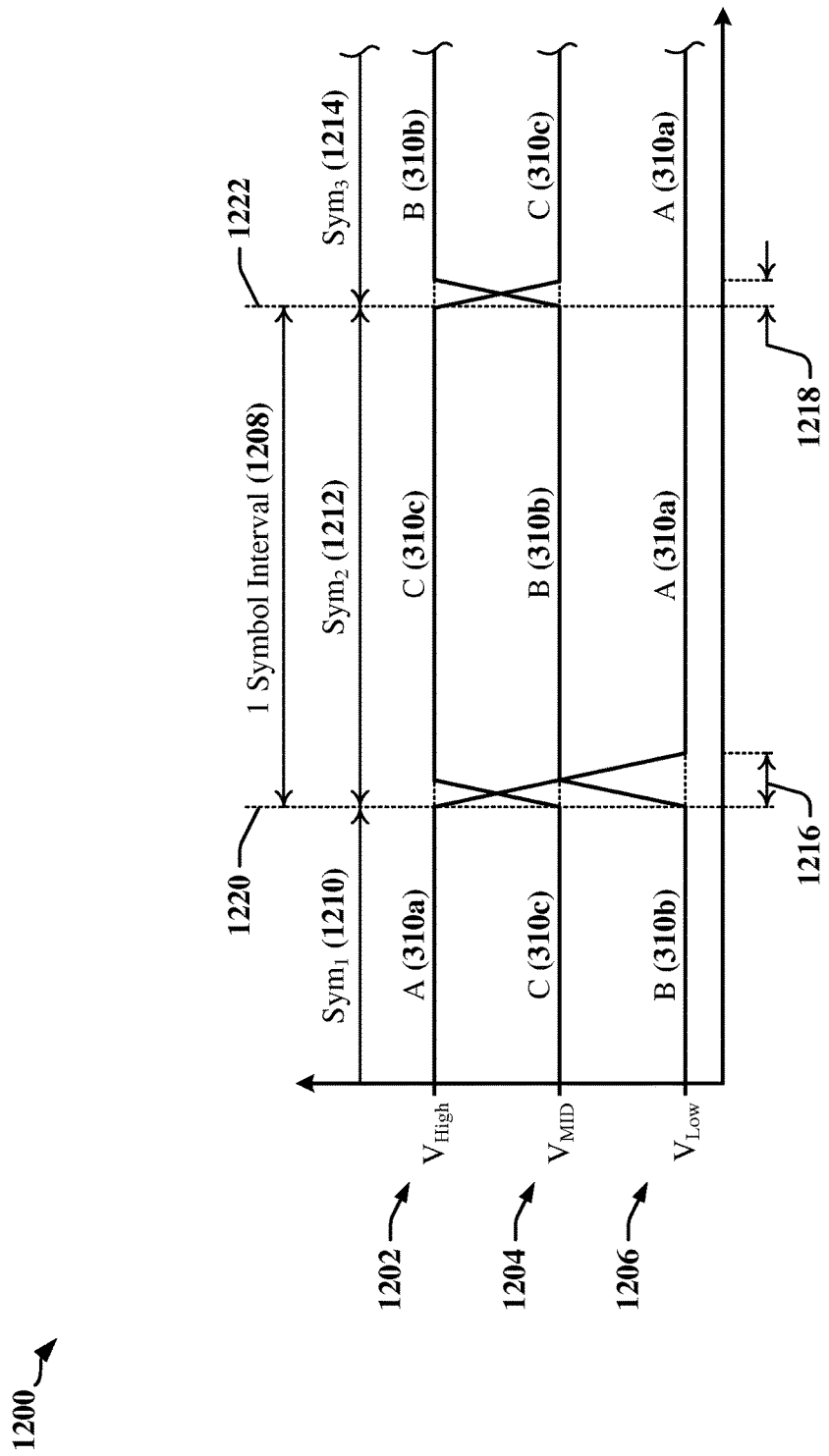
FIG. 12 illustrates timing associated with the transmission of three symbols on a C-PHY interface.

FIG. 12 is a simplified timing diagram 1200 that illustrates timing associated with the transmission of three symbols 1210, 1212, 1214 on a C-PHY interface. The timing diagram 1200, in particular, illustrates transitions associated with the second symbol 1212. A first transition between a first symbol 1210 and the second symbol 1212 commences at a time 1220 and involves a transition in signaling state on each of the three signal wires 310*a*, 310*b*, and 310*c* between the three available voltage levels 1202, 1204, and 1206. A second transition between the second symbol 1212 and a third symbol 1214 commences at a time 1222 and involves transitions in signaling state between the mid-level voltage level 1204 and the high voltage level 1202. One signal wire 310*a* remains at the low voltage level 1206 during the second transition. The time span between the first and second transitions may correspond to one symbol interval 1208. As discussed herein, the transition interval 1216 corresponding to the first transition may be different in duration from the transition interval 1218 associated with the second transition.

Figure 13:
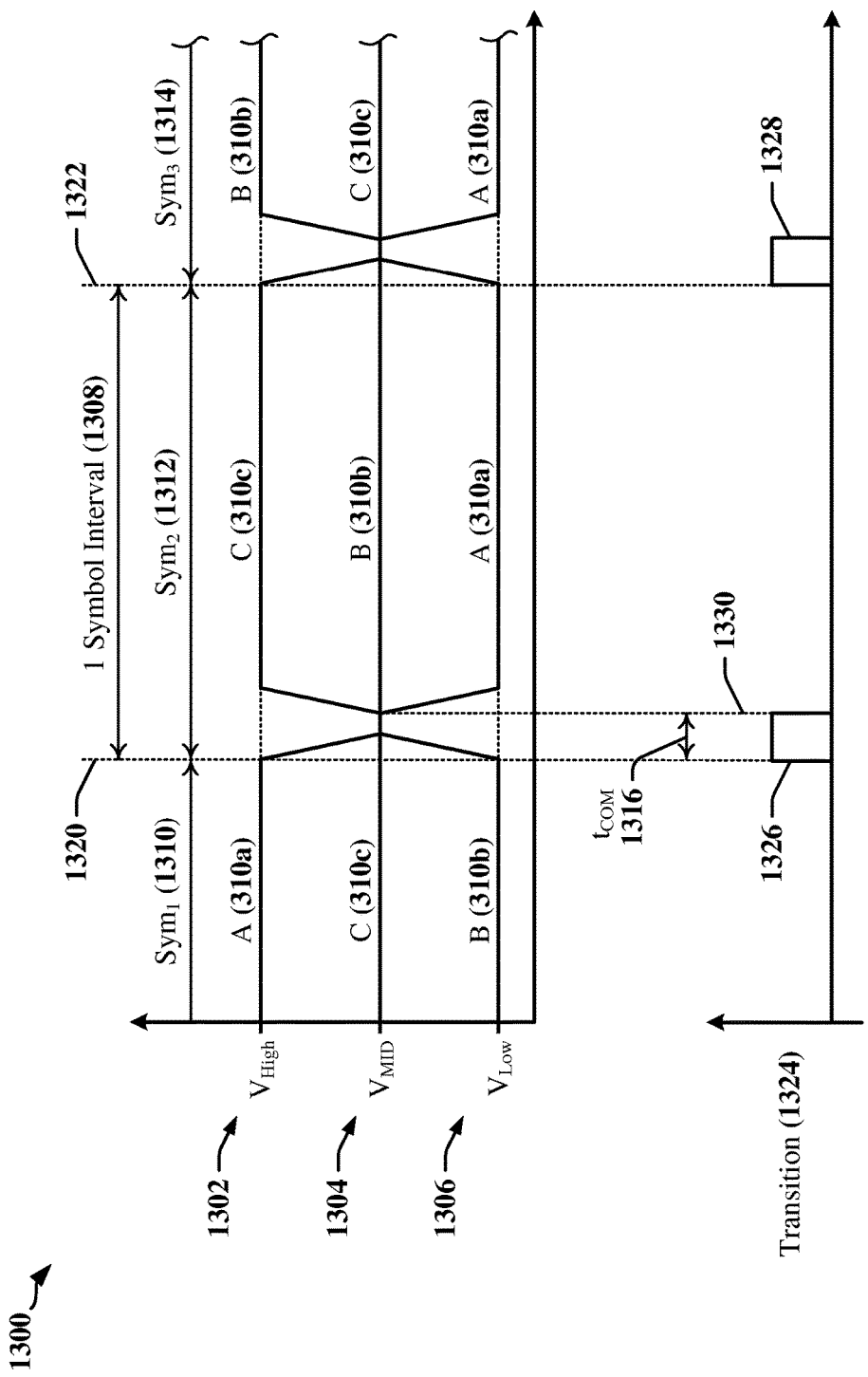
FIG. 13 illustrates timing associated with the transmission of three symbols on a C-PHY interface adapted in accordance with certain aspects disclosed herein.

FIG. 13 is a simplified timing diagram 1300 that illustrates timing associated with the transmission of three symbols 1310, 1312, 1314 on a C-PHY interface adapted in accordance with certain aspects disclosed herein. The timing diagram 1300 illustrates two transitions associated with the second symbol 1312. A first transition between a first symbol 1310 and the second symbol 1312 commences at a time corresponding to a symbol beginning 1320 and results in a transition in signaling state on each of the three signal wires 310*a*, 310*b*, and 310*c* between the three available voltage levels 1302, 1304, and 1306 corresponding to signaling states of the three signal wires 310*a*, 310*b*, and 310*c*. A second transition between the second symbol 1312 and the beginning 1322 of a third symbol 1314, and results in a transitions in signaling state between the mid-level voltage level 1304 and the high voltage level 1302. One signal wire 310*a* remains at the low voltage level 1306 after the second transition. The time span between the first and second transitions may correspond to one symbol interval 1308.

In this example, the C-PHY interface may be adapted to force each of the three signal wires 310*a*, 310*b*, and 310*c* to a predefined intermediate or common voltage level for a predetermined time interval commencing at or near the start of the transitions between transmitted symbols. In some examples, the intermediate or common voltage level may correspond to the mid-level voltage level 1304. The predefined intermediate or common voltage level may be selected based on the time required for one or more of the three signal wires 310*a*, 310*b*, 310*c* to be driven from the intermediate or common voltage level to one of the three voltage levels 1302, 1304, 1306 that represent signaling states. A transition signal 1324 may be provided to control the driving of the three signal wires 310*a*, 310*b*, and 310*c* during the transition interval. As illustrated, the transition signal 1324 includes pulses 1326, 1328 that are active at the beginning 1320, 1322 of each symbol 1310, 1312, 1314. Each pulse 1326, 1328 may have a duration ($t_{COM}$) 1316 that may be calculated to enable each of the three signal wires 310*a*, 310*b*, and 310*c* to reach the predefined intermediate or common voltage level an example depicted, the predefined intermediate or common voltage level coincides with the mid-level voltage level 1304. At a time 1330, that may correspond to the falling edge of the pulse 1326, each of the three signal wires 310*a*, 310*b*, 310*c* is driven to the voltage level 1302, 1304, 1306 defined by the current symbol 1310, 1312, 1314. In this manner, all transitions may be aligned when the times required to transition from the predefined intermediate or common voltage level to each of the three voltage levels 1302, 1304, and 1306 are equalized or substantially equalized.

Pulses 1326, 1328 on the transition signal 1324 may have a short duration 1316 relative to the symbol interval 1308. For example, the duration 1316 of the pulses 1326, 1328 may be 50 picoseconds or 75 picoseconds, while the symbol transmission time may be 400 picoseconds. In some examples, the pulses 1326, 1328 may have a duration 1316 that is less than, or limited to, 25% of the duration of a symbol interval 1308. Upon termination of a pulse 1326, 1328 each signal wire 310*a*, 310*b*, and 310*c* transitions to the state defined by the next symbol 1312, 1314 for transmission.

The transition signal 1324 may have a period that matches the period of the transmission clock that controls the data rate on the C-PHY interface. The pulse duration 1316 may be controlled, configured or tuned using a delay element, for example. The pulse duration 1316 may be controlled, configured or tuned to obtain an optimized transition time between the symbols, where optimization may be accomplished when jitter is minimized without increasing the total transition time by an amount that jeopardizes the capture window available at the receiver. One effect on the transmitted signals is that the zero crossings for all the three differential signal pairs (A-B, B-C, A-C) may converge on the same value at the beginning and at the end of each symbol 1310, 1312, 1314. Thus the encoding jitter in the transmitted signal is reduced, and the horizontal eye opening at the receiver is increased.

Figure 14:
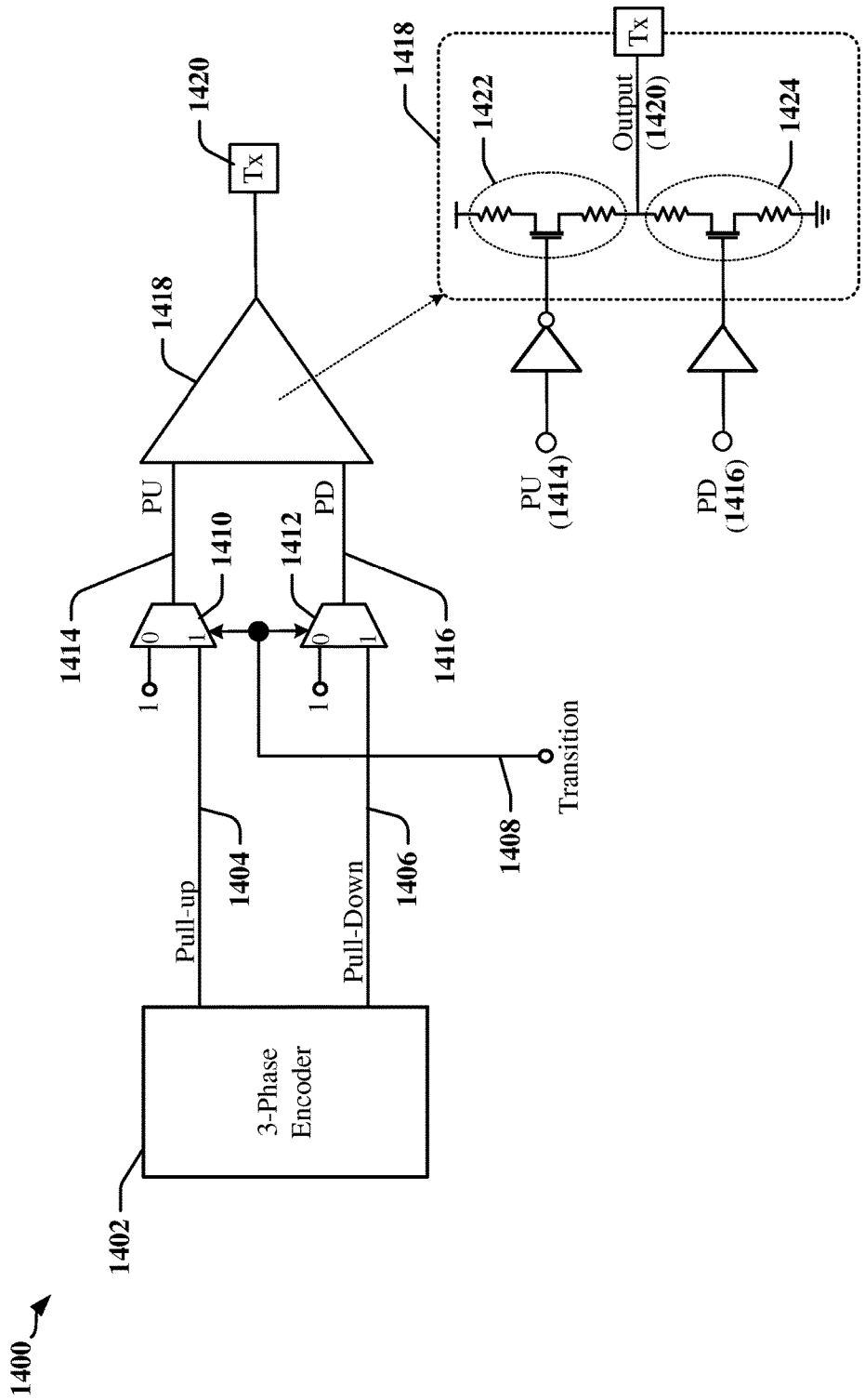
FIG. 14 illustrates a line driver in a C-PHY 3-phase interface that has been adapted according to certain aspects disclosed herein.

FIG. 14 is a simplified diagram 1400 illustrating a line driver in a C-PHY 3-phase interface that has been adapted according to certain aspects disclosed herein. A 3-phase encoder 1402 may be configured to provide a pull-up signal 1404 and a pull-down signal 1406. In operation outside the signal transition region 1104 (see FIG. 11), a high pull-up signal 1404 causes a first signal wire 310*a*, 310*b*, or 310*c* to be driven to the high voltage level 1302, while a high pull-down signal 1406 causes a second signal wire 310*a*, 310*b*, or 310*c* to be driven to the low voltage level 1306. When both the pull-up signal 1404 and the pull-down signal 1406 are in a low logic state, the corresponding signal wire 310a, 310b, or 310c floats, or is pulled to the mid-level voltage level 1304.

According to certain aspects disclosed herein, the pull-up signal 1404 and the pull-down signal 1406 may be provided to gating or selecting logic, such as the multiplexers 1410 and 1412. The gating or selecting logic may be controlled by the transition signal 1408, which may correspond to the transition signal 1324 illustrated in FIG. 13. When in a low logic state, the transition signal 1408 may cause the multiplexers 1410, 1412 to pass the pull-up signal 1404 and the pull-down signal 1406 through to the line driver circuit 1418 as the PU signal 1414 and the PD signal 1416, respectively. When in a high logic state, the transition signal 1408 may cause the multiplexers 1410, 1412 to provide a high logic state on both the PU signal 1414 and the PD signal 1416. As a result, transistors 1422 and 1424 are turned on and the output 1420 of the line driver circuit 1418 is actively driven toward the mid-level voltage level 1304. In some instances, dedicated transistors (not shown) responsive to the transition signal may be used to drive the output of the line driver circuit 1418 to a common voltage level. In such instances the common voltage may be selectable, and/or variable, and may be different from the mid-level voltage level 1304.

Figure 15:
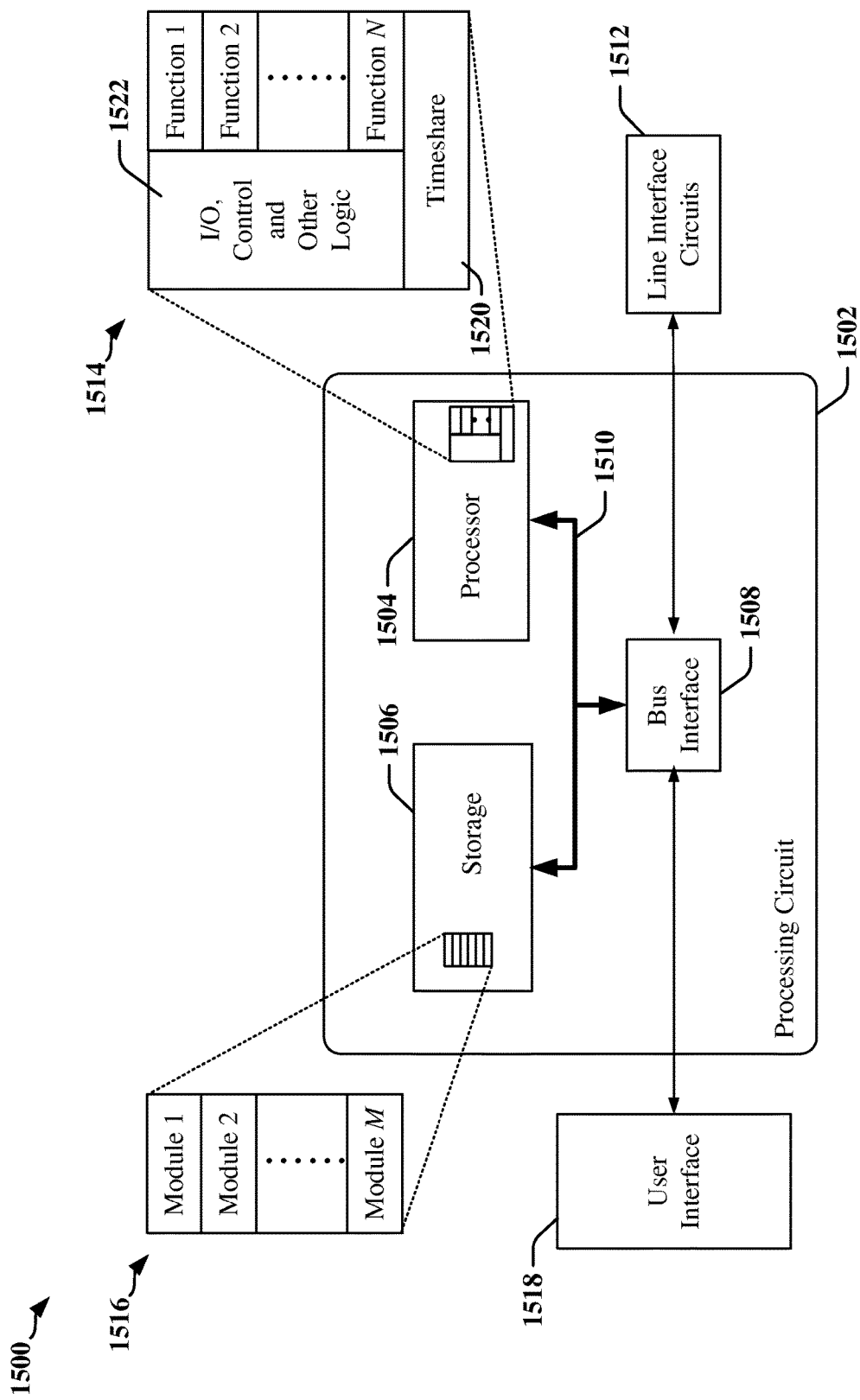
FIG. 15 is a block diagram illustrating an example of an apparatus employing a processing circuit that may be adapted according to certain aspects disclosed herein.

FIG. 15 is a conceptual diagram 1500 illustrating a simplified example of a hardware implementation for an apparatus employing a processing circuit 1502 that may be configured to perform one or more functions disclosed herein. In accordance with various aspects of the disclosure, an element, or any portion of an element, or any combination of elements as disclosed herein may be implemented using the processing circuit 1502. The processing circuit 1502 may include one or more processors 1504 that are controlled by some combination of hardware and software modules. Examples of processors 1504 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1504 may include specialized processors that perform specific functions, and that may be configured, augmented or controlled by one of the software modules 1516. The one or more processors 1504 may be configured through a combination of software modules 1516 loaded during initialization, and further configured by loading or unloading one or more software modules 1516 during operation.

In the illustrated example, the processing circuit 1502 may be implemented with a bus architecture, represented generally by the bus 1510. The bus 1510 may include any number of interconnecting buses and bridges depending on the specific application of the processing circuit 1502 and the overall design constraints. The bus 1510 links together various circuits including the one or more processors 1504, and storage 1506. Storage 1506 may include memory devices and mass storage devices, and may be referred to herein as computer-readable media and/or processor-readable media. The bus 1510 may also link various other circuits such as timing sources, timers, peripherals, voltage regulators, and power management circuits. A bus interface 1508 may provide an interface between the bus 1510 and one or more transceivers 1512. A transceiver 1512 may be provided for each networking technology supported by the processing circuit. In some instances, multiple networking technologies may share some or all of the circuitry or processing modules found in a transceiver 1512. Each transceiver 1512 provides a means for communicating with various other apparatus over a transmission medium. Depending upon the nature of the apparatus, a user interface 1518 (e.g., keypad, display, speaker, microphone, joystick) may also be provided, and may be communicatively coupled to the bus 1510 directly or through the bus interface 1508.

A processor 1504 may be responsible for managing the bus 1510 and for general processing that may include the execution of software stored in a computer-readable medium that may include the storage 1506. In this respect, the processing circuit 1502, including the processor 1504, may be used to implement any of the methods, functions and techniques disclosed herein. The storage 1506 may be used for storing data that is manipulated by the processor 1504 when executing software, and the software may be configured to implement any one of the methods disclosed herein.

One or more processors 1504 in the processing circuit 1502 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1506 or in an external computer readable medium. The external computer-readable medium and/or storage 1506 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a ROM, a PROM, an erasable PROM (EPROM), an EEPROM, a register, a removable disk, and any other suitable medium for storing software and/or instructions that may be accessed and read by a computer. The computer-readable medium and/or storage 1506 may also include, by way of example, a carrier wave, a transmission line, and any other suitable medium for transmitting software and/or instructions that may be accessed and read by a computer. Computer-readable medium and/or the storage 1506 may reside in the processing circuit 1502, in the processor 1504, external to the processing circuit 1502, or be distributed across multiple entities including the processing circuit 1502. The computer-readable medium and/or storage 1506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1506 may maintain software maintained and/or organized in loadable code segments, modules, applications, programs, etc., which may be referred to herein as software modules 1516. Each of the software modules 1516 may include instructions and data that, when installed or loaded on the processing circuit 1502 and executed by the one or more processors 1504, contribute to a run-time image 1514 that controls the operation of the one or more processors 1504. When executed, certain instructions may cause the processing circuit 1502 to perform functions in accordance with certain methods, algorithms and processes described herein.

Some of the software modules 1516 may be loaded during initialization of the processing circuit 1502, and these software modules 1516 may configure the processing circuit 1502 to enable performance of the various functions disclosed herein. For example, some software modules 1516 may configure internal devices and/or logic circuits 1522 of the processor 1504, and may manage access to external devices such as the transceiver 1512, the bus interface 1508, the user interface 1518, timers, mathematical coprocessors, and so on. The software modules 1516 may include a control program and/or an operating system that interacts with interrupt handlers and device drivers, and that controls access to various resources provided by the processing circuit 1502. The resources may include memory, processing time, access to the transceiver 1512, the user interface 1518, and so on.

One or more processors 1504 of the processing circuit 1502 may be multifunctional, whereby some of the software modules 1516 are loaded and configured to perform different functions or different instances of the same function. The one or more processors 1504 may additionally be adapted to manage background tasks initiated in response to inputs from the user interface 1518, the transceiver 1512, and device drivers, for example. To support the performance of multiple functions, the one or more processors 1504 may be configured to provide a multitasking environment, whereby each of a plurality of functions is implemented as a set of tasks serviced by the one or more processors 1504 as needed or desired. In one example, the multitasking environment may be implemented using a timesharing program 1520 that passes control of a processor 1504 between different tasks, whereby each task returns control of the one or more processors 1504 to the timesharing program 1520 upon completion of any outstanding operations and/or in response to an input such as an interrupt. When a task has control of the one or more processors 1504, the processing circuit is effectively specialized for the purposes addressed by the function associated with the controlling task. The timesharing program 1520 may include an operating system, a main loop that transfers control on a round-robin basis, a function that allocates control of the one or more processors 1504 in accordance with a prioritization of the functions, and/or an interrupt driven main loop that responds to external events by providing control of the one or more processors 1504 to a handling function.

Figure 16:
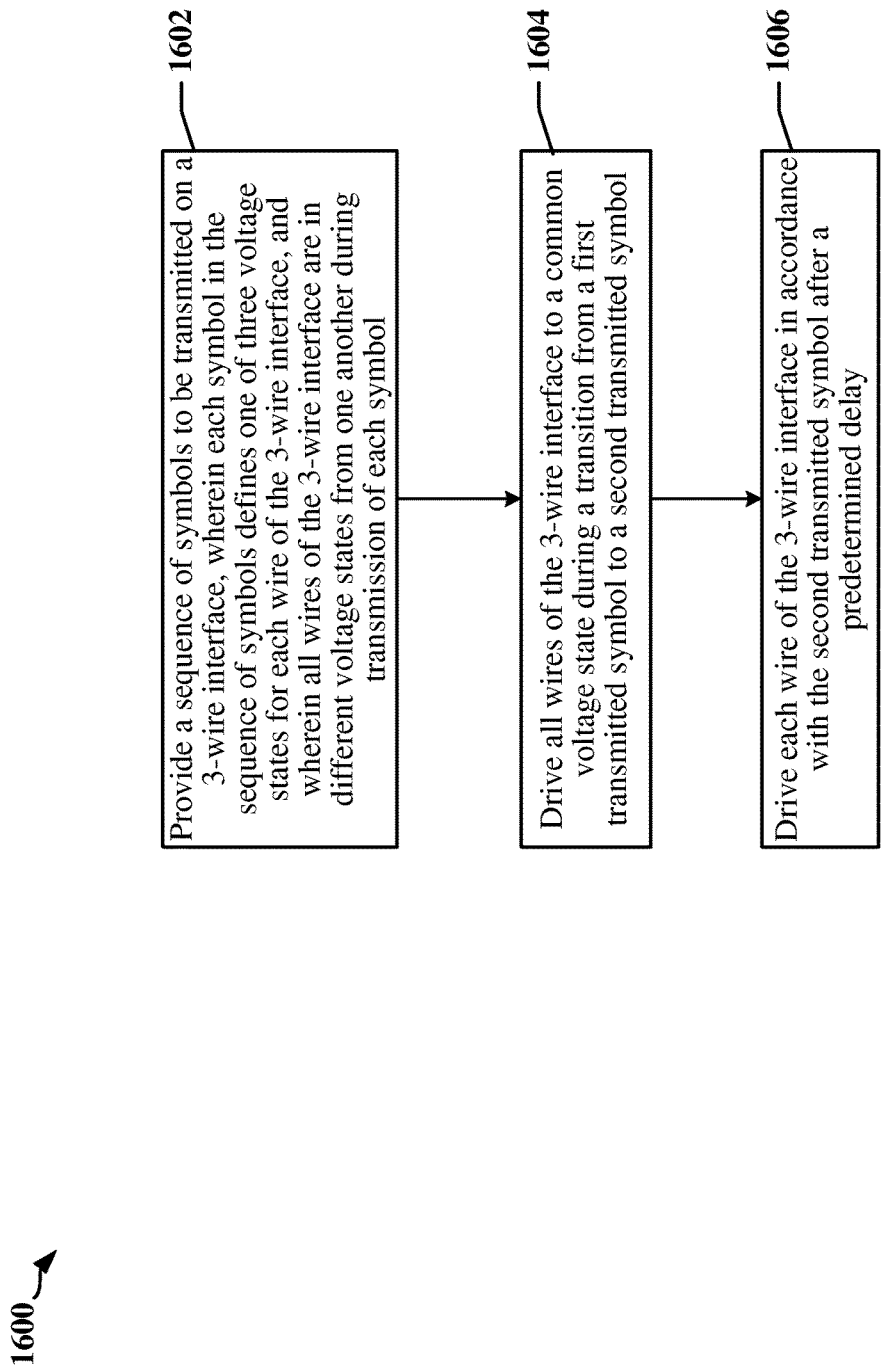
FIG. 16 is a flow chart of a method of data communication according to certain aspects disclosed herein.

FIG. 16 is a flow chart 1600 of a method of communication on a C-PHY 3-Phase interface.

At block 1602, a sequence of symbols may be generated or otherwise provided for transmission on a 3-wire interface. Each symbol in the sequence of symbols may define one of three voltage states for each wire of the 3-wire interface. Each wire is in a different voltage state from the other wires of the 3-wire interface during transmission of the each symbol.

At block 1604, all wires of the 3-wire interface may be driven to a common voltage state during a transition from a first transmitted symbol to a second transmitted symbol. The common voltage state may lie between two of the three voltage states defined for each wire of the 3-wire interface.

At block 1604, each wire of the 3-wire interface may be driven in accordance with the second transmitted symbol after a predetermined delay. In one example, all wires of the 3-wire interface may be driven to the common voltage state for a predetermined time interval commencing at the beginning of a transition from a first transmitted symbol to a second transmitted symbol, where the predetermined delay corresponds to the predetermined time interval. When the predetermined time interval has elapsed, the 3-wire interface may then assume a signaling state corresponding to the second transmitted symbol.

In one example, the three voltage states include a first voltage state, a second voltage state greater than the first voltage state, and a mid-level voltage state that lies between the first voltage state and the second voltage state. The common voltage state may lie between the first voltage state and the second voltage state. In some instances, the common voltage state may be the mid-level voltage state.

In some instances, a duration of pulses to be provided in a transition signal may be selected using a programmable delay element or the like. The duration of the pulses in the transition signal may be selected or determined based on a time interval during which there is signal uncertainty at a boundary between consecutive symbols transmitted on the 3-wire interface. The time interval may correspond to the signal transition region 1104 illustrated in FIG. 11. The transition signal may be generated such that a pulse occurs at each transition between the consecutive symbols. The transition signal may cause all wires of the 3-wire interface to be driven to the common voltage state for the duration of each pulse. The duration of the pulses may be selected and/or adjusted to minimize the time interval during which there is signal uncertainty and to reduce encoding jitter on the 3-wire interface. In one example, the transition signal may minimize differences in the time that two or more wires of the 3-wire interface begin to transition from a state defined by a current symbol to a state defined by a next symbol.

In some instances, a pulse may be provided at each transition between consecutive symbols transmitted on the 3-wire interface. The pulse may have a duration corresponding to the predetermined delay. All wires of the 3-wire interface may be driven towards the common voltage state for the duration of the pulse. In one example, the pulse may have a duration of at least 50 picoseconds. In another example, the pulse may have a duration of less than 75 picoseconds. In some examples, the pulse may have a duration that is less than 25% of a symbol interval during which a symbol is transmitted on the 3-wire interface.

In various examples, phase-shifted versions of a 3-phase signal may be concurrently transmitted on the 3-wire interface such that the 3-phase signal is transmitted in a different phase on each wire of the 3-wire interface. In some instances, a phase-shifted version of a 3-phase signal is transmitted on each wire of the 3-wire interface such that the phase-shifted version transmitted on each wire is 120 degrees phase-shifted from the phase shifted version transmitted on each of the other wires of the 3-wire interface.

Figure 17:
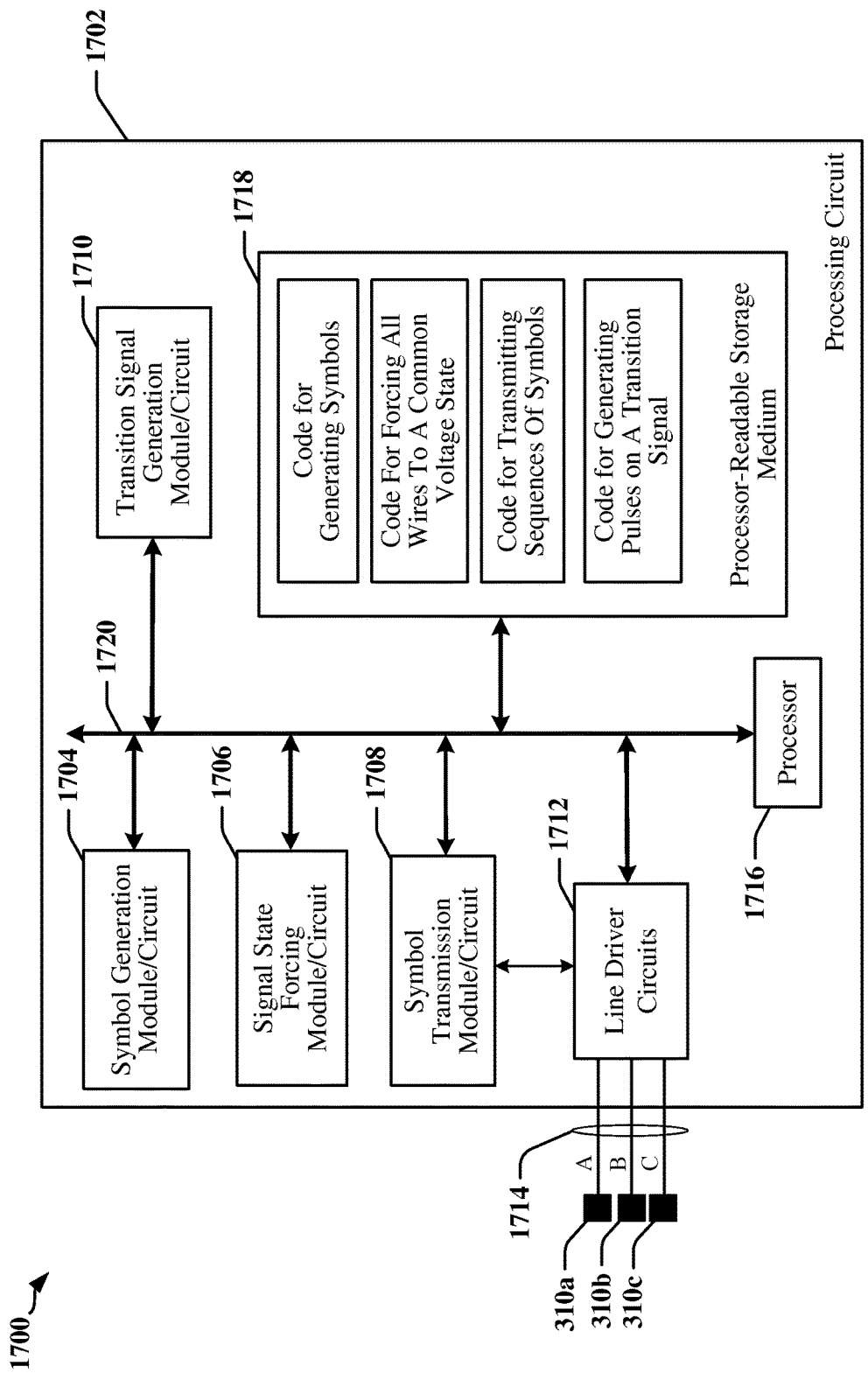
FIG. 17 is a diagram illustrating an example of a hardware implementation for an apparatus employing a processing employing a processing circuit adapted according to certain aspects disclosed herein.

FIG. 17 is a diagram illustrating a simplified example of a hardware implementation for an apparatus 1700 employing a processing circuit 1702. The processing circuit typically has a processor 1716 that may include one or more of a microprocessor, microcontroller, digital signal processor, a sequencer and a state machine. The processing circuit 1702 may be implemented with a bus architecture, represented generally by the bus 1720. The bus 1720 may include any number of interconnecting buses and bridges depending on the specific application of the processing circuit 1702 and the overall design constraints. The bus 1720 links together various circuits including one or more processors and/or hardware modules, represented by the processor 1716, the modules or circuits 1704, 1706 and 1708, line driver circuits 1712 configurable to communicate over connectors or wires 1714 and the computer-readable storage medium 1718. The bus 1720 may also link various other circuits such as timing sources, peripherals, voltage regulators, and power management circuits, which are well known in the art, and therefore, will not be described any further.

The processor 1716 is responsible for general processing, including the execution of software stored on the computer-readable storage medium 1718. The software, when executed by the processor 1716, causes the processing circuit 1702 to perform the various functions described supra for any particular apparatus. The computer-readable storage medium 1718 may also be used for storing data that is manipulated by the processor 1716 when executing software, including data decoded from symbols transmitted over the connectors or wires 1714, which may be configured as data lanes and clock lanes. The processing circuit 1702 further includes at least one of the modules 1704, 1706 and 1708. The modules 1704, 1706 and 1708 may be software modules running in the processor 1716, resident/stored in the computer-readable storage medium 1718, one or more hardware modules coupled to the processor 1716, or some combination thereof. The modules 1704, 1706 and/or 1708 may include microcontroller instructions, state machine configuration parameters, or some combination thereof.

In one configuration, the apparatus 1700 may be configured for data communication over a C-PHY 3-phase interface. The apparatus 1700 may include a module and/or circuit 1704 that is configured to provide a sequence of symbols to be transmitted on a 3-wire interface, a signal forcing module and/or circuit 1706 that is configured to drive all wires of the 3-wire interface to a common voltage state during a transition from a first transmitted symbol to a second transmitted symbol, a module and/or circuit 1708 that is configured to drive each wire of the 3-wire interface in accordance with the second transmitted symbol, and a module and/or circuit 1710 that is configured to provide pulses in a transition signal at each transition between consecutive symbols transmitted on the 3-wire interface.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of data communication, comprising:
providing a sequence of symbols to be transmitted on a 3-wire interface, wherein each symbol in the sequence of symbols defines one of three voltage states for each wire of the 3-wire interface, and wherein all wires of the 3-wire interface are in different voltage states from one another during transmission of each symbol;
driving all wires of the 3-wire interface to a common voltage state during a transition from a first transmitted symbol to a second transmitted symbol; and
driving each wire of the 3-wire interface in accordance with the second transmitted symbol after a predetermined non-zero delay.

2. The method of claim 1, wherein the three voltage states include a first voltage state, a second voltage state greater than the first voltage state, and a mid-level voltage state that lies between the first voltage state and the second voltage state, and wherein the common voltage state lies between the first voltage state and the second voltage state.

3. The method of claim 2, wherein the common voltage state is the mid-level voltage state.

4. The method of claim 1, further comprising:
providing a pulse at each transition between consecutive symbols transmitted on the 3-wire interface, the pulse having a duration corresponding to the predetermined delay,
wherein all wires of the 3-wire interface are driven to the common voltage state for the duration of the pulse.

5. The method of claim 4, wherein the pulse has a duration of at least 50 picoseconds.

6. The method of claim 4, wherein the pulse has a duration of less than 75 picoseconds.

7. The method of claim 4, wherein the pulse has a duration that is less than 25% of a symbol interval during which a symbol is transmitted on the 3-wire interface.

8. The method of claim 1, wherein three phase-shifted versions of a 3-phase signal are concurrently transmitted on the 3-wire interface such that the 3-phase signal is transmitted in a different phase on each wire of the 3-wire interface.

9. The method of claim 1, further comprising:
determining a duration of pulses to be provided in a transition signal, wherein the duration of the pulses is based on a time interval during which there is signal uncertainty at a boundary between consecutive symbols transmitted on the 3-wire interface; and
generating the transition signal such that a pulse occurs at each transition between the consecutive symbols,
wherein all wires of the 3-wire interface are driven to the common voltage state for the duration of the pulses, and
wherein the duration of the pulses is adjusted to minimize the time interval during which there is signal uncertainty and to reduce encoding jitter on the 3-wire interface.

10. An apparatus adapted to communicate over a 3-wire interface, comprising:
means for providing a sequence of symbols to be transmitted on the 3-wire interface, including an encoding circuit that produces symbols that define one of three voltage states for each wire of the 3-wire interface, wherein all wires of the 3-wire interface are in different voltage states from one another during transmission of each symbol;

means for driving all wires of the 3-wire interface to a common voltage state during a transition from a first transmitted symbol to a second transmitted symbol; and means for driving each wire of the 3-wire interface in accordance with the second a transmitted symbol after a predetermined non-zero delay.

11. The apparatus of claim 10, wherein the three voltage states include a first voltage state, a second voltage state greater than the first voltage state, and a mid-level voltage state that lies between the first voltage state and the second voltage state, and wherein the common voltage state lies between two of the three voltage states.

12. The apparatus of claim 10, further comprising:
means for providing a pulse at each transition between consecutive symbols transmitted on the 3-wire interface, the pulse having a duration corresponding to the predetermined delay,
wherein each wire of the 3-wire interface is driven to the common voltage state for the duration of the pulse.

13. The apparatus of claim 12, wherein the pulse has a duration of at least 50 picoseconds.

14. The apparatus of claim 12, wherein the pulse has a duration of less than 75 picoseconds.

15. The apparatus of claim 12, wherein the pulse has a duration that is less than 25% of a symbol interval during which a symbol is transmitted on the 3-wire interface.

16. The apparatus of claim 10, wherein three phase-shifted versions of a 3-phase signal are concurrently transmitted on the 3-wire interface such that the 3-phase signal is transmitted in a different phase on each wire of the 3-wire interface.

17. An apparatus for data communication, comprising:
a plurality of line drivers coupled to a 3-wire bus;
an encoder configured to provide a sequence of symbols to be transmitted on the 3-wire bus, each symbol in the sequence of symbols defining one of three voltage states for each wire of the 3-wire bus, wherein all wires of the 3-wire bus are in different voltage states from one another during transmission of each symbol; and
a processing system configured to:
cause the plurality of line drivers to drive all wires of the 3-wire bus to a common voltage state during a transition from a first transmitted symbol to a second transmitted symbol, wherein the common voltage state lies between two of the three voltage states; and
cause the plurality of line drivers to drive each wire of the 3-wire bus in accordance with the second transmitted symbol after a predetermined non-zero delay.

18. The apparatus of claim 17, wherein the three voltage states include a first voltage state, a second voltage state greater than the first voltage state, and a mid-level voltage state that lies between the first voltage state and the second voltage state, and wherein the common voltage state that lies between the first voltage state and the second voltage state.

19. The apparatus of claim 17, wherein the processing system is configured to:
determine a duration of pulses to be provided in a transition signal, wherein the duration of the pulses is determined based on a time interval during which there is signal uncertainty at a boundary between consecutive symbols transmitted on the 3-wire bus; and
generate the transition signal such that a pulse occurs at each transition between consecutive symbols transmitted on the 3-wire bus,
wherein all wires of the 3-wire bus are driven to the common voltage state for the duration of the pulses, and
wherein the duration of the pulses is adjusted to minimize the time interval during which there is signal uncertainty and to reduce encoding jitter on the 3-wire bus.

20. The apparatus of claim 17, wherein the processing system is configured to:
providing a pulse at each transition between consecutive symbols transmitted on the 3-wire bus, the pulse having a duration corresponding to the predetermined delay,
wherein all wires of the 3-wire bus are driven to the common voltage state for the duration of the pulse.

21. The apparatus of claim 20, wherein the pulse has a duration of at least 50 picoseconds.

22. The apparatus of claim 20, wherein the pulse has a duration of less than 75 picoseconds.

23. The apparatus of claim 20, wherein the pulse has a duration that is less than 25% of a symbol interval during which a symbol is transmitted on the 3-wire bus.

24. The apparatus of claim 17, wherein three phase-shifted versions of a 3-phase signal are concurrently transmitted on the 3-wire bus such that the 3-phase signal is transmitted in a different phase on each wire of the 3-wire bus.

25. A non-transitory processor readable storage medium, comprising code for:
causing an encoder to provide a sequence of symbols to be transmitted on a 3-wire interface, wherein each symbol in the sequence of symbols defines one of three voltage states for each wire of the 3-wire interface, and wherein all wires of the 3-wire interface are in different voltage states from one another during transmission of each symbol;
cause a plurality of line drivers to drive all wires of the 3-wire interface to a common voltage state for a predetermined non-zero time interval during a transition from a first transmitted symbol to a second transmitted symbol, wherein the common voltage state lies between two of the three voltage states; and
cause the plurality of line drivers to drive each wire of the 3-wire interface in accordance with the second transmitted symbol after the predetermined interval has elapsed.

26. The storage medium of claim 25, wherein the three voltage states include a first voltage state, a second voltage state greater than the first voltage state, and a mid-level voltage state that lies between the first voltage state and the second voltage state, and wherein the common voltage state that lies between the first voltage state and the second voltage state.

27. The storage medium of claim 25, further comprising code for:
determining a duration of pulses to be provided in a transition signal, wherein the duration of the pulses is based on a time interval during which there is signal uncertainty at a boundary between consecutive symbols transmitted on the 3-wire interface; and
configuring a signal generation circuit to generate the transition signal such that a pulse occurs at each transition between the consecutive symbols,
wherein all wires of the 3-wire interface are driven to the common voltage state for the duration of the pulses, and wherein the duration of the pulses is adjusted to minimize the time interval during which there is signal uncertainty and to reduce encoding jitter on the 3-wire interface.

28. The storage medium of claim 25, further comprising code for:
causing signal generation logic coupled to the encoder to provide a pulse at each transition between consecutive symbols transmitted on the 3-wire interface, the pulse having a duration corresponding to the predetermined interval,
wherein all wires of the 3-wire interface are driven to the common voltage state for the duration of the pulse.

29. The storage medium of claim 28, wherein the pulse has a duration of at least 50 picoseconds.

30. The storage medium of claim 28, wherein the pulse has a duration of less than 75 picoseconds.

* * * * *